US012347359B2

(12) United States Patent
Wu et al.

(10) Patent No.: US 12,347,359 B2
(45) Date of Patent: Jul. 1, 2025

(54) DISPLAY METHOD AND DEVICE FOR SPLICING DISPLAY SCREEN, COMPUTER DEVICE AND STORAGE MEDIUM

(71) Applicant: BOE TECHNOLOGY GROUP CO., LTD., Beijing (CN)

(72) Inventors: Yanhong Wu, Beijing (CN); Xian Wang, Beijing (CN); Congrui Wu, Beijing (CN); Ran Duan, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/705,537

(22) PCT Filed: Apr. 28, 2023

(86) PCT No.: PCT/CN2023/091410
§ 371 (c)(1),
(2) Date: Apr. 27, 2024

(87) PCT Pub. No.: WO2024/001496
PCT Pub. Date: Jan. 4, 2024

(65) Prior Publication Data
US 2025/0087128 A1 Mar. 13, 2025

(51) Int. Cl.
*G09G 3/20* (2006.01)
*G09G 3/32* (2016.01)

(52) U.S. Cl.
CPC ............. *G09G 3/2074* (2013.01); *G09G 3/32* (2013.01); *G09G 2320/0276* (2013.01); *G09G 2320/041* (2013.01); *G09G 2360/16* (2013.01)

(58) Field of Classification Search
CPC .................. G09G 3/2074; G09G 3/32; G09G 2320/0276; G09G 2320/041; G09G 2360/16
See application file for complete search history.

(56) References Cited

U.S. PATENT DOCUMENTS

2022/0159183 A1* 5/2022 Li ........................ H04N 23/635

* cited by examiner

*Primary Examiner* — Yaron Cohen
(74) *Attorney, Agent, or Firm* — HOUTTEMAN LAW LLC

(57) ABSTRACT

The present disclosure provides a display method for a splicing display screen, which belongs to the technical field of image display, wherein the splicing display screen includes a plurality of display panels spliced with each other, and the display method includes: determining initial gray-scale compensation data according to first gray-scale data for each pixel in current frame of image data and a pre-generated gray-scale compensation data table; acquiring temperature influence data of current frame of image data, and filtering each temperature influence data according to preset filter parameter information to obtain a gray-scale compensation coefficient; determining target gray-scale compensation data according to the gray-scale compensation coefficient and the initial gray-scale compensation data; and compensating a gray scale of the current frame of image data according to the target gray-scale compensation data to obtain compensated frame of image data.

19 Claims, 9 Drawing Sheets

DISPLAY METHOD AND DEVICE FOR SPLICING DISPLAY SCREEN, COMPUTER DEVICE AND STORAGE MEDIUM

CROSS-REFERENCE TO RELATED APPLICATIONS

The application claims the priority of Chinese Patent Application No. 202210763583.8, filed on Jun. 30, 2022, the contents of which are incorporated herein by reference in its entirety.

FIELD OF THE DISCLOSURE

The present disclosure belongs to the technical field of image display, and particularly relates to a display method for a splicing display screen, a display device for a splicing display screen, a computer device and a storage medium.

BACKGROUND OF THE DISCLOSURE

A regional temperature difference occurs when a certain picture with gray scales is displayed on a Micro LED (i.e., MLED) splicing display screen based on the miniaturization and matrixing technology of light-emitting diodes (LEDs) for a long time, and in turn a visible image sticking occurs when the displayed pictures on the screen are switched due to the fact that the luminous efficiency of the screen is reduced along with the rise of the temperature. Therefore, eliminating the visible image sticking on the screen and optimizing the display effect of the screen are urgent issues that need to be solved in the field of display screens.

SUMMARY OF THE DISCLOSURE

In order to solve at least one of the technical problems existing in the prior art, the present disclosure provides a display method for a splicing display screen, a display device for a splicing display screen, a computer device, and a storage medium.

As a first aspect, an embodiment of the present disclosure provides a display method for a splicing display screen including a plurality of display panels spliced with each other, wherein the display method includes: sampling frames of image data in a sequence of video frames according to a preset sequence; and compensating, each time one frame of image data is sampled, a gray scale of the sampled current frame of image data to obtain the compensated frame of image data. Compensating the gray scale of the sampled current frame of image data to obtain the compensated frame of image data, includes: determining initial gray-scale compensation data according to first gray-scale data for each pixel in the current frame of image data and a gray-scale compensation data table generated in advance; acquiring temperature influence data for the current frame of image data, and filtering each temperature influence data according to preset filter parameter information to obtain a gray-scale compensation coefficient; determining target gray-scale compensation data according to the gray-scale compensation coefficient and the initial gray-scale compensation data; and compensating the gray scale of the current frame of image data according to the target gray-scale compensation data to obtain compensated frame of image data.

In some examples, acquiring the temperature influence data for the current frame of image data, includes: determining, according to at least one frame of history image data, a target influence coefficient of each frame of history image data on the current frame of image data, and attribute information of the splicing display screen, the temperature influence data of the history image data on the current frame of image data; wherein the at least one frame of history image data is at least one frame of image data sampled before the current frame of image data is sampled.

In some examples, determining, according to the at least one frame of history image data, the target influence coefficient of each frame of history image data on the current frame of image data, and the attribute information of the splicing display screen, the temperature influence data of the history image data on the current frame of image data, includes: weighting second gray-scale data for each pixel in each frame of history image data based on each target influence coefficient to obtain first gray-scale image data; and processing third gray-scale data for each pixel in the first gray-scale image data according to the attribute information of the splicing display screen and the predetermined fitting relationship information between a gray scale and a temperature influence to determine the temperature influence data.

In some examples, filtering each temperature influence data according to the preset filter parameter information to obtain the gray-scale compensation coefficient, includes: dividing, according to a number of parameters in the filter parameter information and resolution information of each display panel, each display panel into a plurality of display regions; determining regional temperature influence data for each display region according to each temperature influence data; filtering the regional temperature influence data according to the filter parameter information to obtain an regional gray-scale compensation coefficient; and serving each regional gray-scale compensation coefficient as the gray-scale compensation coefficient of each pixel in the corresponding display region.

In some examples, determining the first gray-scale data for each pixel in the current frame of image data, includes: acquiring a ratio of gray scales of sub-pixels of each pixel in the current frame of image data; and determining the first gray-scale data according to the ratio of gray scales of the sub-pixels and the pixel information of the sub-pixels.

In some examples, acquiring the ratio of the gray scales of the sub-pixels of each pixel in the current frame of image data, includes: lighting up the splicing display screen according to colors of the sub-pixels respectively to obtain temperature variation amounts of the splicing display screen for the colors of the sub-pixels; and serving a ratio of the temperature variation amounts of the splicing display screen for the colors as the ratio of the gray scales of the sub-pixels.

In some examples, determining the gray-scale compensation data table, includes: determining, when the splicing display screen is lit up according to a first gray scale, an average temperature of the splicing display screen as a first initial temperature; and traversing through gray scales in a preset gray-scale range at the first initial temperature to determine first luminance information corresponding to each of the gray scales; determining, when the splicing display screen is lit up according to a second gray scale, an average temperature of the splicing display screen as a maximum temperature; traversing through gray scales in a preset gray-scale range at the maximum temperature to determine second luminance information corresponding to each of the gray scales; under a condition that the first luminance information and the second luminance information meet a first preset condition, respectively determining a first target gray scale and a second target gray scale, and calculating a difference value between the first target gray scale and the second target gray scale as a compensation gray scale; wherein the gray-scale compensation data table includes the compensation gray scales of the gray scales in the preset gray-scale range.

In some examples, the display method further includes: determining a peak luminance variation factor of the splicing display screen according to preset actual peak luminance and measured peak luminance for the second gray scale; wherein the gray-scale compensation data table further includes the peak luminance variation factor of the splicing display screen.

In some examples, determining the initial gray-scale compensation data according to the first gray-scale data for each pixel in the current frame of image data and the gray-scale compensation data table generated in advance, includes: screening out a target compensation gray scale from the gray-scale compensation data table according to the first gray-scale data; and determining the initial gray-scale compensation data according to the target compensation gray scale and the peak luminance variation factor.

In some examples, determining the target influence coefficient of each frame of history image data on the current frame of image data, includes: acquiring a time interval when visible image sticking occurs; and determining the number of frames of image data during the time interval according to the number of the frames of image data uploaded per second; acquiring multiple frames of test image data according to the number of the frames of image data during the time interval and acquiring preset initial influence coefficients of the multiple frames of test image data; wherein a sum of the initial influence coefficients is 1, and the initial influence coefficient of the immediately previous frame of test image data is greater than or equal to the initial influence coefficient of the next frame of test image data; acquiring a first temperature increased amount of the splicing display screen after the splicing display screen plays the multiple frames of test image data; weighting fourth gray-scale data of each pixel in each frame of the test image data based on each initial influence coefficient to obtain second gray-scale image data; lighting up the splicing display screen according to the second gray-scale image data for a lighting-up time period, with the lighting-up time period being the same as a time period for playing the multiple frames of test image data; acquiring a second temperature increased amount of the splicing display screen after the lighting-up time period elapses; and when a difference between the first temperature increased amount and the second temperature increased amount does not meet a second preset condition, updating the initial influence coefficient until the difference between the first temperature increased amount and the second temperature increased amount meets the second preset condition, and serving the updated initial influence coefficient as the target influence coefficient.

In some examples, acquiring the time interval when the visible image sticking occurs, includes: lighting up a first region of the splicing display screen according to a first gray scale; lighting up a second region of the splicing display screen according to a second gray scale; and lighting up both of the first region and the second region simultaneously according to the second gray scale every target time interval to obtain the time interval when the visible image sticking occurs.

In some examples, updating the initial influence coefficient, includes: for each of the initial influence coefficients, respectively adjusting the initial influence coefficients of the immediately previous frame of test image data and the next frame of test image data, such that the adjusted initial influence coefficient of the immediately previous frame of test image data is larger than the unadjusted initial influence coefficient of the immediately previous frame of test image data, and the adjusted initial influence coefficient of the next frame of test image data is smaller than the unadjusted initial influence coefficient of the next frame of test image data.

In some examples, the attribute information of the splicing display screen includes screen characteristics and peak luminance. Determining the fitting relationship information between the gray scale and the temperature influence, includes: acquiring a second initial temperature of the splicing display screen before the splicing display screen is not lit up; for one of the screen characteristic and various peak luminance of the splicing display screen, respectively traversing through the gray scales in a preset gray-scale range to determine first average temperatures of the splicing display screen; and determining a first set of influence factors according to the first average temperatures corresponding to the gray scales and the second initial temperature; for one of the peak luminance and various screen characteristics of the splicing display screen, respectively traversing through gray scales in a preset gray-scale range to determine second average temperatures of the splicing display screen; and determining a second set of influence factors according to the second average temperatures corresponding to the gray scales and the second initial temperature; and acquiring, through a fitting process, the fitting relationship information between the gray scale and the temperature influence according to the first set of influence factors and the second set of influence factors corresponding to the gray scales in the preset gray-scale range.

In some examples, determining the filter parameter information, includes: acquiring a third initial temperature of P×P display panels of the splicing display screen before the P×P display panels are not lit up wherein P is a positive integer; lighting up a target display panel located in a center of the P×P display panels according to a second gray scale; and dividing each of the display panels into a plurality of display regions to obtain a third average temperature of each of the display regions; calculating a difference between the third average temperature and the third initial temperature as a temperature variation amount of each display region; and normalizing a ratio of the temperature variation amount of each display region to a maximum temperature variation amount of the display region to obtain the filter parameter information, wherein the number of parameters in the filter parameter information is the same as the number of the divided display regions.

In some examples, the display method further includes: storing the current frame of image data into a history cache database to update the history image data.

As a second aspect, an embodiment of the present disclosure provides a display device for a splicing display screen, including a plurality of display panels spliced with each other, wherein the display device for the splicing display screen includes a gray-scale compensation module. The gray-scale compensation module is configured to sample frames of image data in a sequence of video frames according to a preset sequence; and compensate, each time one frame of image data is sampled, a gray scale of the sampled current frame of image data to obtain compensated frame of image data. The gray-scale compensation module includes a first determination unit, a filtering unit, a second determination unit, and a compensation unit. The first determination unit is configured to determine initial gray-scale compensation data according to first gray-scale data for each pixel in the current frame of image data and a pre-generated gray-scale compensation data table; the filtering unit is configured to acquire temperature influence data of the current frame of image data; and filter each temperature influence data according to preset filter parameter information to obtain a gray-scale compensation coefficient; the second determination unit is configured to determine target gray-scale compensation data according to the gray-scale compensation coefficient and the initial gray-scale compensation data; and the compensation unit is configured to compensate a gray scale of the current frame of image data according to the target gray-scale compensation data to obtain the compensated frame of image data.

As a third aspect, an embodiment of the present disclosure further provides a computer device, including a processor, a memory and a bus. The memory stores machine readable instructions executable by the processor, the processor communicates with the memory via the bus when the computer device operates, when the machine readable instructions are executed by the processor, the machine readable instructions cause the processor to perform the display method for the splicing display screen as described in any one of the examples of the first aspect.

As a fourth aspect, an embodiment of the present disclosure further provides a non-transitory computer-readable storage medium storing computer programs which, when executed by a processor, cause the processor to perform the display method for the splicing display screen as described in any one of the examples of the first aspect.

As a fifth aspect, an embodiment of the present disclosure further provides an electronic product, including the display device for the splicing display screen as described in the second aspect.

DETAILED DESCRIPTION OF THE EXEMPLARY EMBODIMENTS

Figure 1:
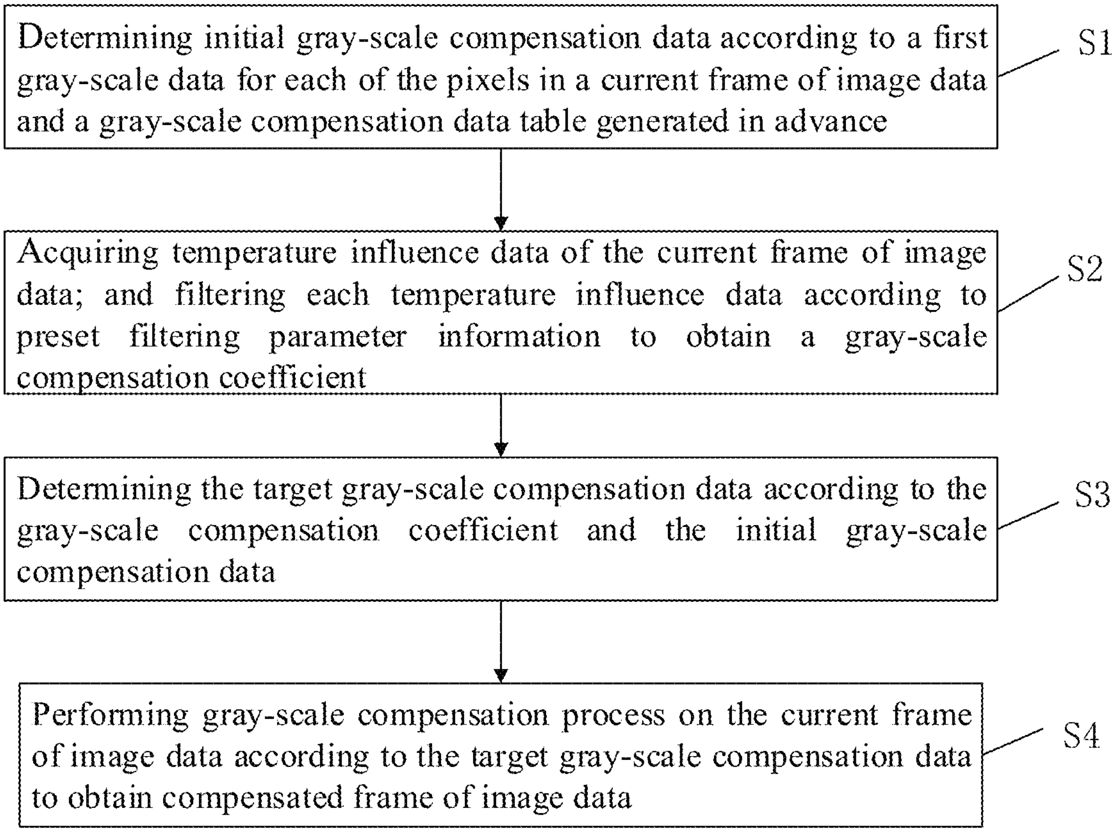
FIG. 1 is a flowchart of a display method for a splicing display screen according to an embodiment of the present disclosure.

In order to enable one of ordinary skill in the art to better understand the technical solutions of the present invention/utility model, the present invention/utility model will be described in further detail with reference to the attached drawings and the detailed description.

Unless defined otherwise, technical or scientific terms used herein shall have the ordinary meaning as understood by one of ordinary skill in the art to which the present disclosure belongs. "First," "second," and the like in the present disclosure is not intended to indicate any order, quantity, or importance, but rather distinguish one element from another. Also, the terms "a," "an," or "the" and similar referents do not denote a limitation of quantity, but rather denote the presence of at least one element. The word "include" or "comprise", and the like, means that the element or item preceding the word includes the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like may indicate relative positional relationships, and when the absolute position of the object being described is changed, the relative positional relationships may also be changed accordingly.

In order to facilitate understanding of the embodiments of the present disclosure, a display method for a splicing display screen according to the embodiments of the present disclosure will be described in details. An execution main body of the display method for the splicing display screen according to the embodiments of the present disclosure is generally a computer device with certain computing capability. In some possible implementations, the display method for the splicing display screen may be implemented by a processor calling computer readable instructions stored in a memory.

Researches have shown that a difference in temperature occurs in regions when a splicing screen such as an MLED splicing screen displays a certain gray scale picture for a long time, and visible image sticking occurs when the displayed images of the screen are switched since the luminous efficiency of the screen is decreased along with the temperature rises, resulting in the disturbance to the consistency of the displayed images.

In order to solve the problem above, the present disclosure provides a display method for a splicing display screen, which includes sampling the frames of image data (i.e., the data for frames of images) in a sequence of video frames according to a preset sequence (that is, a play order of the sequence of video frames), and performing a gray-scale compensation process on (i.e., compensating a gray scale of) the current frame of image data (i.e., the data for the current frame of image) obtained each time sampling one frame of image data, to obtain compensated frame of image data. The gray-scale compensation process may be performed on the sampled current frame of image data without acquiring the temperature of the splicing display screen, that is, an image sticking reduction process, which can improve the uniformity and consistency of the displayed images, thereby enhancing the visual experience of the user.

The specific process for performing the gray-scale compensation process on the current frame of image data obtained by sampling to obtain the compensated frame of image data will be described in detail below. The splicing display screen includes a plurality of display panels which are spliced together. FIG. 1 is a flowchart of a display method for a splicing display screen according to an embodiment of the present disclosure. As shown in FIG. 1, the display method includes steps S1 to S4.

At step S1, determining initial gray-scale compensation data according to a first gray-scale data for each of the pixels of a current frame of image data and a gray-scale compensation data table generated in advance.

In the step, the current frame of image data is a frame of image data collected at a current moment from a sequence of video frames according to a preset sequence. The image data includes the gray-scale data for each pixel in the image, and similarly, the current frame of image data includes the first gray-scale data for each pixel in the current frame of image.

The first gray-scale data for each pixel may be directly obtained. For example, for image data, a pixel in an image is driven by a current signal, and the first gray-scale data corresponds to the strength of the signal. After the current frame of image data is obtained, based on the detected strength of the signal corresponding to each pixel in the current frame of image data, the first gray-scale data of the pixel may be directly obtained.

Alternatively, the first gray-scale data for each pixel may be determined based on pixel information of sub-pixels of the pixel. Specifically, a ratio of gray scales of the sub-pixels in each pixel in the current frame of image data is obtained; and the first gray-scale data is determined according to the ratio of the gray scales and the pixel information of the sub-pixels.

It should be noted that each pixel in the image includes three sub-pixels, for example, the three sub-pixels are a red sub-pixel, a green sub-pixel, and a blue sub-pixel. The red sub-pixel, the green sub-pixel and the blue sub-pixel respectively correspond to three channels of the pixel, that is, the red sub-pixel corresponds to a red channel R, the green sub-pixel corresponds to a green channel G, and the blue sub-pixel corresponds to a blue channel B. The pixel information of the sub-pixel may be a channel value of the channel corresponding to the sub-pixel, that is, a red channel value r corresponding to the red channel R, a green channel value g corresponding to the green channel G, and a blue channel value b corresponding to the blue channel B.

In some examples, given a ratio of the gray scales of the red, green, and blue sub-pixels is $R:G:B=\alpha 1:\alpha 2:\alpha 3$ and the channel values of the sub-pixels are r, g, and b, the first gray-scale data is obtained by weighting and summing up the three channel values r, g, and b according to the ratio of the gray scales of the sub-pixels, that is, $\alpha 1\times r+\alpha 2\times g+\alpha 3\times b$.

The ratio of the gray scales of the sub-pixels may be preset and thus be directly obtained. Determining the ratio of the gray scales of the sub-pixels may include steps S11 and S12 below, which will not be described in detail herein.

The gray-scale compensation data table may be generated in advance and thus may be obtained directly. The process for generating the gray-scale compensation data table may refer to steps S101 to S104 below, which will not be described in detail herein.

The gray-scale compensation data table includes various gray-scale data, compensation data for each gray scale, and a peak luminance variation factor. In an implementation, a target compensation gray scale is screened out from the gray-scale compensation data table according to the first gray-scale data; and the initial gray-scale compensation data is determined according to the target compensation gray scale and the peak luminance variation factor.

Taking into account the variation in the peak luminance of the splicing display screen, the peak luminance variation factor $\alpha$ is a variation factor calculated for the different measured peak luminance, that is, $\alpha$=actual peak luminance/measured peak luminance, wherein the actual peak luminance is fixed at 400 nit and may be determined based on the actual parameters relevant to the splicing display screen. Based on the first gray-scale data, the gray-scale compensation data table is queried to obtain the target compensation gray scale $\Delta d$ of the first gray-scale data; the peak luminance variation factor $\alpha$ is determined according to the measured peak luminance currently set for the splicing display screen; and the queried target compensation gray scale $\Delta d$ of the first gray-scale data is multiplied by the peak luminance variation factor $\alpha$ to obtain the initial gray-scale compensation data do corresponding to the pixel.

At step S2, acquiring temperature influence data of the current frame of image data; and filtering each temperature influence data according to preset filter parameter information to obtain a gray-scale compensation coefficient.

Herein, the filter parameter information may be preset and thus be directly obtained. Setting the filter parameter information may include steps S301 to S304, which will not be described in detail herein.

In an implementation, acquiring temperature influence data of the current frame of image data may include: determining the temperature influence data of the history image data on the current frame of image data according to at least one frame of history image data (i.e., data for at least one frame of history image), a target influence coefficient of each frame of history image data (i.e., data for each frame of history image) on the current frame of image data, and the attribute information of the splicing display screen.

The at least one frame of history image data is at least one frame of image data sampled prior to sampling the current frame of image data. The history image data is stored in a history cache database.

It should be noted that a frame rate N of the history image data is determined based on a time interval $\Delta t$ when visible image sticking occurs and the frames per second (FPS), denoted as F, of the frames of image data in the sequence of video frames, that is, $N=\Delta t\times F$.

Determining the time interval $\Delta t$ when visible image sticking occurs specifically includes: lighting up the splicing display screen with the highest contrast (both in white and black) at a timing $t_0$; and switching the splicing display screen to full white screen every time interval $t_1$ to obtain a timing $t_2$ when the visible sticking image appears to human eyes, therefore the time interval $\Delta t$ when visible image sticking occurs is $\Delta t=t_2-t_0$.

It should be noted that lighting up the splicing display screen both in white and black refers to lighting up a portion of the splicing display screen in a gray scale of 255 (i.e., the display screen displays white) and lighting up another portion of the splicing display screen in a gray scale of 0 (i.e., the display screen displays black). The splicing display screen includes two portions displaying white and black, respectively, so that the splicing display screen has the highest contrast.

Since the condition that the visible image sticking occurs is that the display screen displays images in the gray scale of the history image data for a long time, the gray scale of the history image data has a certain influence on the gray scale of the current frame of image data. Therefore, it is required to determine a target influence coefficient of each frame of history image data on the current frame of image data. In addition, since the temperature influence capability is different when the splicing display screen displays in different attribute information, the influence of the attribute information of the splicing display screen is required to determine the temperature influence data of the history image data on the current frame of image data.

In an implementation, a preset algorithm may be employed. At least one frame of history image data, the target influence coefficient of each frame of history image data on the current frame of image data, and the attribute information of the splicing display screen are respectively used as input data of the preset algorithm, and the temperature influence data of the history image data on the current frame of image data are output.

In some examples, second gray-scale data for the pixels in each frame of history image data are weighted by using the target influence coefficients to obtain first gray-scale image data. Third gray-scale data for each of the pixels in the first gray-scale image data is processed based on the attribute information of the splicing display screen and predetermined fitting relationship information between the gray scale and the temperature influence, so as to determine the temperature influence data. The target influence coefficient of each frame of history image data is predetermined and thus may be directly obtained. The process for setting the target influence coefficient for each frame of history image data will be described in detail in steps S21 to S26 below, and will not be repeated herein. It should be noted that a sum of the target influence coefficients is 1, that is $\Sigma_{i=0}^{N}a_i=1$, where $a_i$ represents a target influence coefficient corresponding to an $i^{th}$ frame of history image data, and N represents N frames of history image data.

The second gray-scale data is a gray-scale value of a pixel in history image data and may be directly obtained. Coordinates of a pixel in each frame of history image data are (x, y), the second gray-scale data of the pixel (x, y) is denoted as $Gray^{(x,y)}$, and the second gray-scale data of the pixel (x, y) in the $i^{th}$ frame of history image data is denoted as $Gray_i^{(x,y)}$.

The first gray-scale image data may be determined according to Equation 1:

$$Gray_{mean}^{(x,y)} = \sum_{i=0}^{N} Gray_i^{(x,y)} \times a_i \qquad \text{Equation 1}$$

$Gray_{mean}^{(x,y)}$ represents the third gray-scale data of the pixel (x, y) in the first gray-scale image data. The third gray-scale data of the pixels form the first gray-scale image data.

The attribute information of the splicing display screen includes screen characteristics and peak luminance. The screen characteristics may be gamma characteristics. Since different gamma characteristics and different peak luminance may be set for the splicing display screen and the temperature influence capability is different when the splicing display screen displays in different gamma characteristics or different peak luminance, it is required to obtain the gamma characteristics and the peak luminance (i.e., the measured peak luminance) currently set for the splicing display screen. And then, the third gray-scale data for each pixel in the first gray-scale image data is processed based on the predetermined fitting relationship information between the gray scale and the temperature influence, so as to determine the temperature influence data, under the influence of the attribute information, of each third gray-scale data in the first gray-scale image data.

Herein, the fitting relationship information between the gray scale and the temperature influence is predetermined and is described in detail in steps S201 to S204 below, which will not be described in detail herein.

The fitting relationship between the gray scale Gray and the temperature influence Y is $Y=\theta\times Gray^{\gamma}$, where, θ=actual peak luminance/measured peak luminance. The actual peak luminance is a fixed peak luminance of 400 nits in general set in advance, the measured peak luminance is a peak luminance currently set for the splicing display screen; and γ represents the gamma value currently set for the splicing display screen.

Specifically, the temperature influence data, under the influence of the attribute information, for each third gray-scale data in the first gray-scale image data may be determined according to Equation 2:

$$Y = \theta \times Gray^{\gamma} \qquad \text{Equation 2}$$

In an example, given the gamma characteristic and the measured peak luminance of the splicing display screen, the temperature influence data $Y_{weighting}$, under the influence of the attribute information, for each third gray-scale data is calculated according to Equation 2 (i.e., $Y=\theta\times Gray^{\gamma}$) based on each third gray-scale data $Gray_{mean}^{(x,y)}$ in the first gray-scale image data.

In an embodiment in which the filter parameter information is set for 3×3 display panels, the filter parameter information includes an M×M filtering coefficient matrix. Resolution information of each of the display panels is h×w. If h≤w, then M=3h; If h>w, M=3w. The temperature influence data $Y_{weighting}$, under the influence of the attribute information, of each third gray-scale data is filtered directly through the M×M filtering coefficient matrix to obtain a corresponding gray-scale compensation coefficient.

In order to reduce the amount of computation and improve the data processing efficiency, each display panel may be divided to a plurality of regions before the filtering is performed and the filtering is performed on each of the regions. In an implementation, each display panel is divided to a plurality of regions according to the number of parameters in the filter parameter information and the resolution information of the display panel to obtain the plurality of display regions; regional temperature influence data of each display region is determined according to temperature influence data; the regional temperature influence data is filtered according to the filter parameter information to obtain an regional gray-scale compensation coefficient; and each regional gray-scale compensation coefficient is used as an gray-scale compensation coefficient of each pixel in the corresponding display region.

Taking 3×3 display panels as an example, each of the display panels is divided to a plurality of regions, and filter parameter information is set. The filter parameter information includes an M×M filtering coefficient matrix, and the resolution information of each display panel is h×w. If each display panel is divided into k×k display regions, the number of parameters in the filter parameter information is M×M=(3k)×(3k), wherein k is 3 or 5. Based on this, before filtering, it is necessary to partition the temperature influence data $Y_{weighting}$. Specifically, based on the number of parameters in the filter parameter information and the resolution information of each display panel, each display panel is divided into k×k display regions; and then, based on the temperature influence data $Y_{weighting}$ of each pixel, the regional temperature influence data $Y_{weighting}'$ of each of the display regions is determined. Specifically, each display region includes (h/k)×(w/k) temperature influence data $Y_{weighting}$, and an average value (i.e., the regional temperature influence data $Y_{weighting}'$) of the temperature influence data $Y_{weighting}$ of each display region is calculated.

Figure 2A:
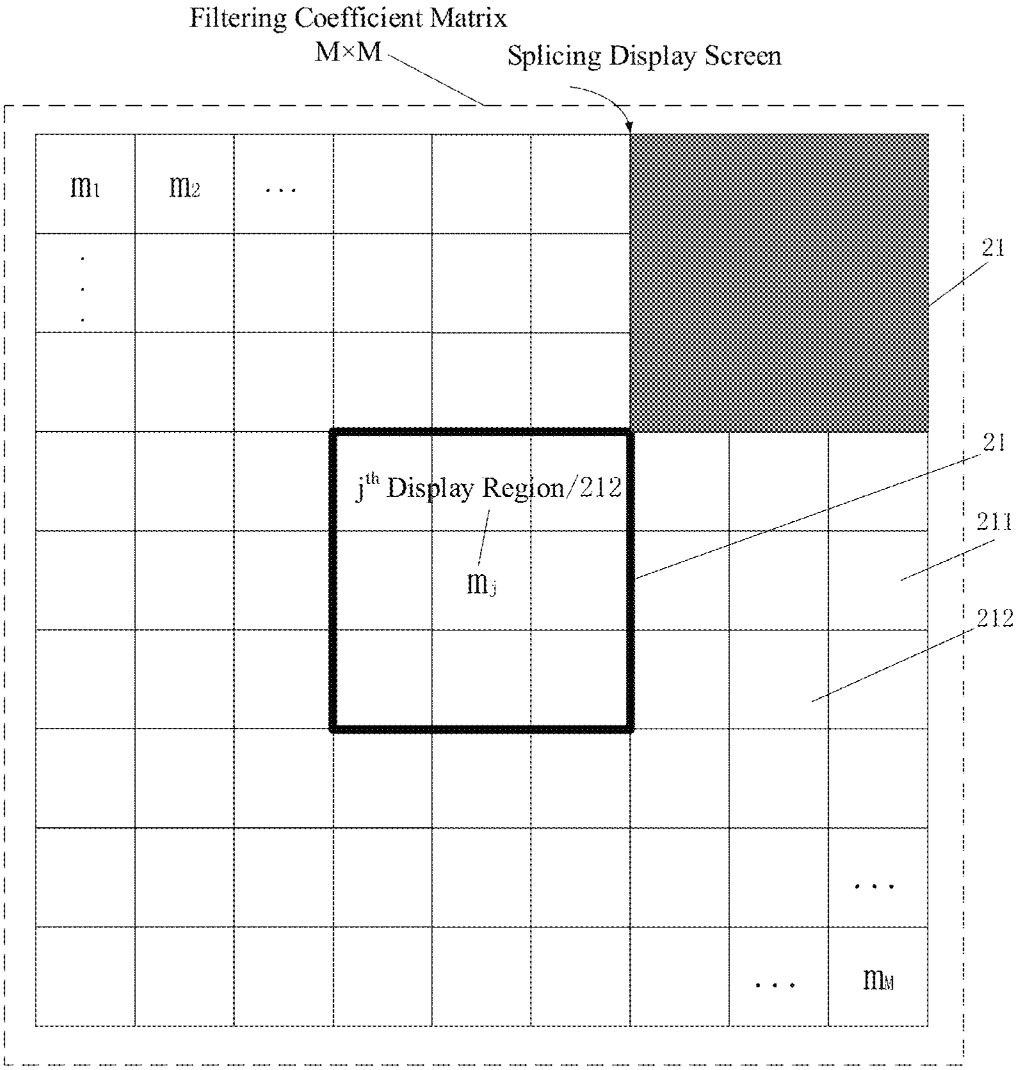
FIG. 2*a* and FIG. 2*b* are schematic diagrams respectively showing filtering processes according to embodiments of the present disclosure.
Figure 2B:
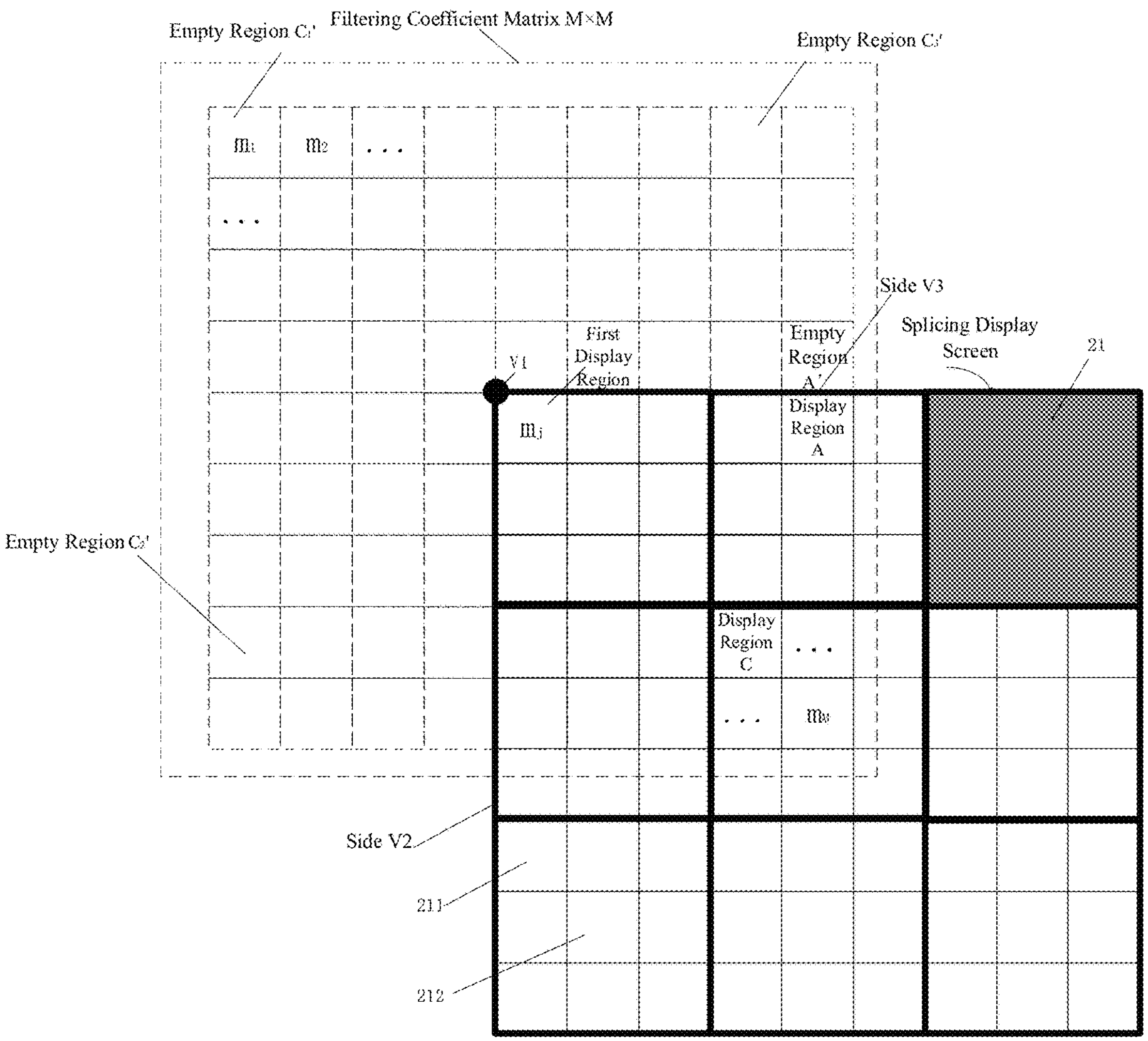

FIG. 2*a* and FIG. 2*b* are schematic diagrams respectively showing filtering processes according to embodiments of the present disclosure. Based on the filter parameter information, the regional temperature influence data is filtered to obtain the gray-scale compensation coefficient. Specifically, as shown in FIG. 2*a*, the M×M filtering coefficient matrix includes the filtering coefficients $m_1, m_2, \ldots, m_M$. Each of the display panels 21 (one of which is filled with gray) is divided into k×k display regions (i.e. 3×3 regions). For a $j^{th}$ display region, if the $j^{th}$ display region does not belong to an edge region 211 of the splicing display screen, i.e., the $j^{th}$ display region is an internal region 212 of the splicing display screen, a filtering coefficient $m_j$ at a center of the M×M filtering coefficient matrix is aligned with the $j^{th}$ display region. The regional gray-scale compensation coefficient $S_j'$ of the $j^{th}$ display region is obtained by multiplying the filtering coefficients $m_1, m_2, \ldots, m_M$ by the temperature influence data $Y_{weighting}'$ of the corresponding display regions and then adding up the products to. Similarly, for other display regions as the internal regions, the gray-scale compensation coefficient S' for each of the display regions are obtained through the method described above.

As shown in FIG. 2*b*, if the $j^{th}$ region belongs to the edge region 211 of the splicing display screen, taking a first region as an example, after aligning the filtering coefficient $m_j$ at the center of the M×M filtering coefficient matrix with the first region, temperature influence data $Y_{weighting}'$ for an empty region aligned with the M×M filtering coefficient matrix is supplemented. For example, the regional temperature influence data $Y_{weighting}'$ for the display regions in the splicing display screen are supplemented to the corresponding empty regions of the M×M filtering coefficient matrix through a mirroring process. Taking the display region C as an example, the regional temperature influence data $Y_{weighting}'$ for the display region C is mirrored to an empty region $C_1'$ with respect to a vertex V1 of the first display region, is mirrored to an empty region $C_2'$ with respect to a side V2, and is mirrored to an empty region $C_3'$ with respect to a side V3. Taking the display region A as an example, the regional temperature influence data $Y_{weighting}'$ for the display region A is mirrored to an empty region A' with respect to a side V3. The regional temperature influence data for other display regions may be mirrored as the same method as above and will not be described herein again. The filtering coefficients $m_1, m_2, \ldots, m_M$ are multiplied with the regional temperature influence data $Y_{weighting}'$ of the corresponding display regions and then the products are added together to obtain the regional gray-scale compensation coefficient $S_1'$ for the first region. Similarly, for other edge regions, the regional gray-scale compensation coefficients S' for each of the other edge regions are obtained through the method described above.

Further, each regional gray-scale compensation coefficient S' severs as the gray-scale compensation coefficient S for each of the pixels in the corresponding display region. Specifically, each regional gray-scale compensation coefficient S' serves as the gray-scale compensation coefficient S for each of the (h/k)×(w/k) pixels in the corresponding display region.

At step S3, determining target gray-scale compensation data according to the gray-scale compensation coefficient and the initial gray-scale compensation data.

The step S3 includes determining the target gray-scale compensation data based on the initial gray-scale compensation data $d_0$ obtained in step S1 and the gray-scale compensation coefficient S obtained in step S2. Specifically, the target gray-scale compensation data for each pixel $d_{target}^{(x,y)}=S^{(x,y)}\times d_0^{(x,y)}$ may be obtained by multiplying the initial gray-scale compensation data $d_0^{(x,y)}$ corresponding to each pixel by the gray-scale compensation coefficient $S^{(x,y)}$ for the pixel.

At step S4, performing gray-scale compensation process on the current frame of image data according to the target gray-scale compensation data to obtain compensated frame of image data.

In some examples, in order to improve uniformity and consistency of gray-scale compensation, for the sub-pixels, i.e., three channels R, G and B, of each pixel in the current frame of image data, the target gray-scale compensation data for the sub-pixels $\mu_1\times d_{target}^{(x,y)}$, $\mu_2\times d_{target}^{(x,y)}$, and $\mu_3\times d_{target}^{(x,y)}$ is respectively determined according to a preset luminance attenuation ratio (i.e., R:G:B=$\mu_1$:$\mu_2$:$\mu_3$) of the three channels. And then, the gray scales of the sub-pixels of each pixel in the current frame of image data are compensated to obtain the red channel value $r'=r-\mu_1\times d_{target}^{(x,y)}$, the green channel value $g'=g-\mu_2\times d_{target}^{(x,y)}$, and the blue channel value $b'=b-\mu_3\times d_{target}^{(x,y)}$, that is, to obtain the updated three-channel values RGB of the pixel. In this case, the updated three-channel values are the compensated image data. Each pixel in the current frame of image data is compensated according to the method described above to obtain the compensated frame of image data.

In some examples, the R channel is the channel that most likely causes temperature changes due to its own characteristics, and thus the R channel has the greatest attenuation amount of the gray scale. In order to improve the efficiency of data processing, the target gray-scale compensation data $d_{target}^{(x,y)}$ is subtracted from the R channel of each pixel in the current frame of image data to obtain updated data of the R channel of the pixel, and then updated three-channel values RGB of the pixel are obtained (wherein the values of the channel G and the channel B are unchanged). In this case, the updated three-channel values are the compensated image data. Each pixel in the current frame of image data is compensated according to the method described above to obtain the compensated frame of image data.

In some examples, due to splicing gaps among the display panels that are spliced together in the splicing display screen, when performing the gray-scale compensation on the current frame of image data, it is necessary to filter the target gray-scale compensation data, in order to further optimize the gray-scale compensation at the splicing gaps among the display panels. Specifically, for the P×P regions ($0<P\leq M$) in the target gray-scale compensation data $d_{target}^{(x,y)}$, an average value of the target gray-scale compensation data $d_{target}^{(x,y)}$ in the P×P regions is calculated, as the filtered gray-scale compensation data $d_{filtering}^{(x,y)}$ for a first small region in the P×P regions; and then, the gray-scale compensation process is performed on the current frame of image data based on the filtered gray-scale compensation data, so as to obtain the compensated frame of image data. The gray-scale compensation process may refer to the step S5 for details and will not be described herein again.

After the compensated frame of image data is obtained, the current frame of image data may be stored into a history cache database to update the history image data.

Figure 3:
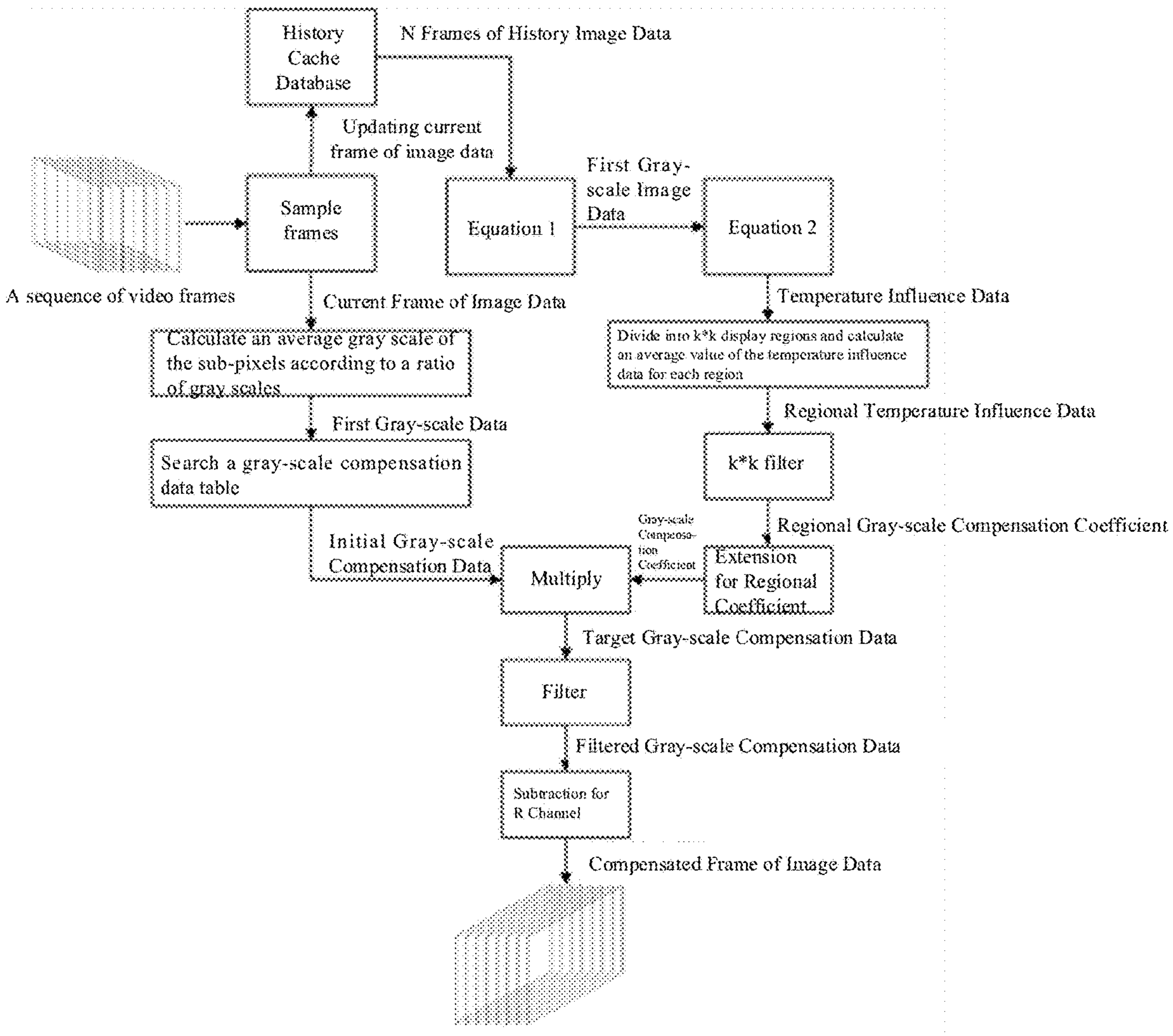
FIG. 3 is a schematic flow chart showing a method for processing image display data according to an embodiment of the present disclosure.

FIG. 3 is a schematic flow chart showing a method for processing image display data according to an embodiment of the present disclosure. As shown in FIG. 3, the method includes steps S31 to S312.

At step S31, inputting a sequence of video frames, sampling the frames of image data in the sequence of video frames according to a preset sequence, and taking the sampled current frame of image data as the current frame of image data.

At step S32, for each pixel in the current frame of image data, calculating an average gray scale of the sub-pixels according to a ratio of the gray-scale as the first gray-scale data of the pixel.

At step S33, according to the first gray-scale data, searching the gray-scale compensation data table to obtain the initial gray-scale compensation data.

At step S34, searching the history cache database for N frames of history image data (N≥1), and calculating the first gray-scale image data $Gray_{mean}^{(x,y)}$ according to Equation 1.

At step S35, substituting the first gray-scale image data $Gray_{mean}^{(x,y)}$ into Equation 2 for calculation to obtain the temperature influence data $Y_{weighting}$.

At step S36, given the number of parameters (3k)×(3k) in the filter parameter information and the resolution information h×w of each display panel, dividing each display panel into k×k regions, with each region having (h/k)×(w/k) pixels. The average value of the temperature influence data $Y_{weighting}$ of each region (i.e., the regional temperature influence data $Y_{weighting}'$) is calculated based on the temperature influence data $Y_{weighting}$ of the pixels in the region.

At step S37, filtering the regional temperature influence data $Y_{weighting}'$ to obtain a regional gray-scale compensation coefficient S'.

At step S38, serving each regional gray-scale compensation coefficient S' as the gray-scale compensation coefficient S for the (h/k)×(w/k) pixels in the corresponding display region.

At step S39, multiplying the initial gray-scale compensation data $d_0^{(x,y)}$ corresponding to each pixel by the gray-scale compensation coefficient $S^{(x,y)}$ for the pixel to obtain the target gray-scale compensation data for each pixel $d_{target}^{(x,y)}=S^{(x,y)}\times d_0^{(x,y)}$.

At step S310, filtering the target gray-scale compensation data $d_{target}^{(x,y)}=S^{(x,y)}\times d_0^{(x,y)}$ to obtain filtered gray-scale compensation $d_{filtering}^{(x,y)}$.

At step S311, subtracting the filtered gray-scale compensation data $d_{filtering}^{(x,y)}$ from the R channel of each pixel in the current frame of image data to obtain compensated frame of image data.

At step S312, storing the current frame of image data into the history cache database to update the history image data.

For the detailed description of each of steps S31 to S312, reference may be made to the detailed description of steps S1 to S5, and the repeated description is not repeated herein again.

In some examples, for the setting of the ratio of the gray scales in step S1, specifically, the light-emitting and heating efficiencies of lamps of three colors corresponding to the three RGB channels of the splicing display screen are greatly different from each other. The splicing display screen is lit up by using three pure colors, respectively, and after the temperature of the splicing display screen is stabilized, a ratio of the temperature increase amounts is the ratio of the gray scales of the three channels, therefore determining the ratio of the gray scales may include steps S11 and S12.

At step S11, lighting up the splicing display screen respectively according to the colors of the sub-pixels to obtain the temperature variation amounts of the splicing display screen for the colors of the sub-pixels.

At step S12, serving the temperature variation amounts of the splicing display screen for the colors of the sub-pixels as the ratio of the gray scales of the sub-pixels.

The colors of the sub-pixels include red, green, and blue.

Figure 4:
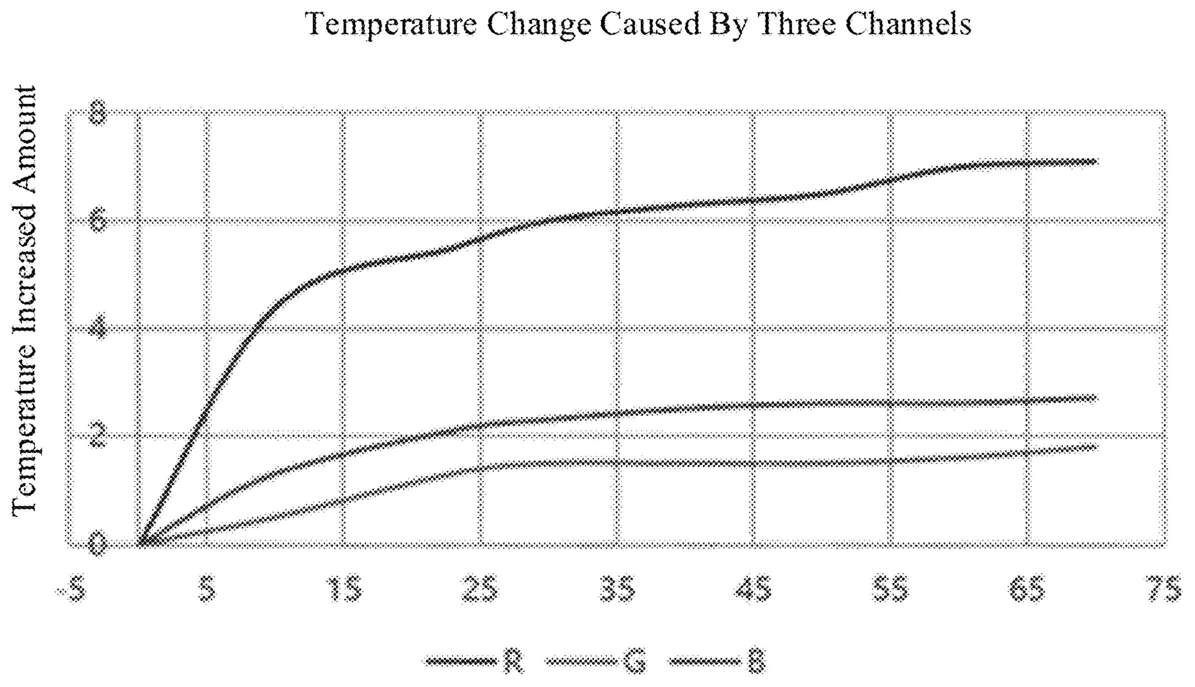
FIG. 4 shows a curve representing a temperature change caused by three channels according to an embodiment of the present disclosure.

FIG. 4 shows a curve representing a temperature change caused by three channels according to an embodiment of the present disclosure. FIG. 4 shows a curve representing a measured temperature change, of the splicing display screen over time when the splicing display screen is lit up by using three pure colors, that is, red, green, and blue, respectively. The heating effect of the red sub-pixel is the most obvious, and the measured temperature increased amount for the red sub-pixel is 6° C. (Centigrade) when the temperature change curve tends to be stable; the heating effect of the blue sub-pixel is inferior, the measured temperature increased amount for the blue sub-pixel is 2.7° C. when the temperature change curve tends to be stable; and the green sub-pixel has the minimum heating effect, the measured temperature increased amount for the green sub-pixel is 2° C. when the temperature change curve tends to be stable. The ratio of the gray scales obtained finally is R:G:B=6.4:2:2.7, and the normalization process is performed on the ratio of the gray scales to obtain R:G:B=α1:α2:α3=0.576577:0.18018:0.243243.

In some examples, since the luminance and the temperature are linearly changed at different gray scales, specifically, the luminance is decreased along with the increase of the temperature, the luminance corresponding to various temperatures for each gray scale may be determined by controlling the change range of the temperatures of the splicing display screen, and in turn the compensation data required for maintaining the fixed luminance at different temperatures for each gray scale may be obtained.

Figure 5A:
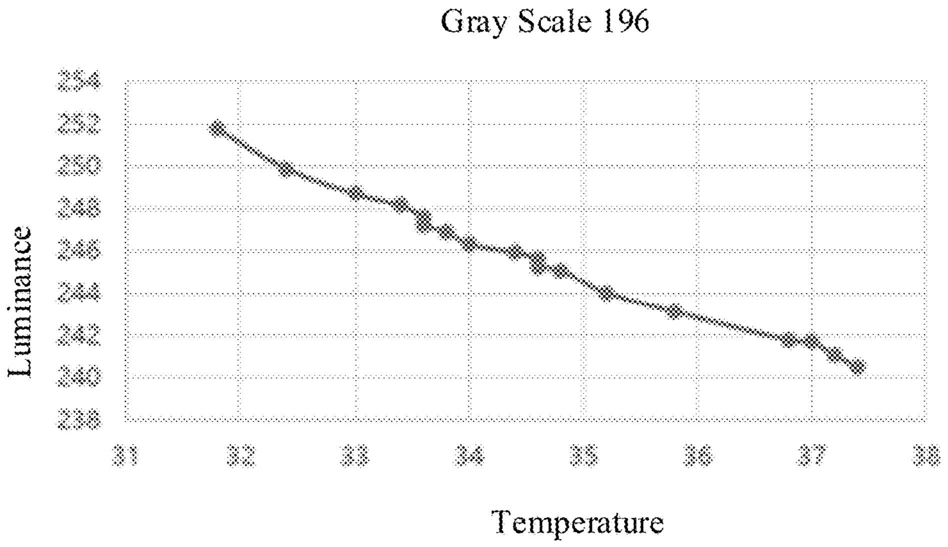
FIGS. 5*a* and 5*b* are schematic diagrams respectively showing curves representing a luminance versus temperature according to embodiments of the present disclosure.
Figure 5B:
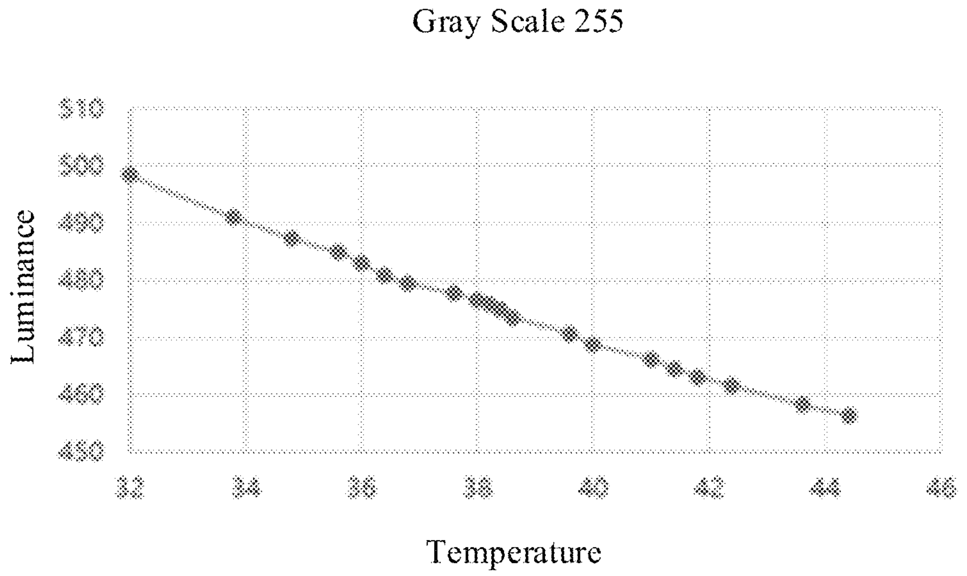

FIGS. 5*a* and 5*b* respectively show curves representing luminance versus temperature according to embodiments of the present disclosure. As shown in FIGS. 5*a* and 5*b*, FIG. 5*a* shows a curve representing that the luminance decreases with the increase of the temperature at gray scale of 196; and FIG. 5*b* shows a curve representing that the luminance decreases with the increase of the temperature at gray scale of 255.

The determination of the gray-scale compensation data table in step S1 includes steps S101 to S104.

At step S101, determining an average temperature of the splicing display screen as a first initial temperature when the splicing display screen is lit up in a first gray scale; and traversing through gray scales in a preset gray-scale range at the first initial temperature to determine first luminance information corresponding to each of the gray scales.

The first gray scale is 0, and the splicing display screen displays white. The method includes after the temperature of the splicing display screen is stable, measuring, by a thermometer, the temperature of each pixel in the splicing display screen; and calculating an average temperature of the entire screen as the first initial temperature $T_0$. The method includes maintaining the splicing display screen at the constant first initial temperature $T_0$; sequentially traversing through gray scales in the preset gray-scale range from 0 to 255, that is, lighting up the splicing display screen in the gray scales; and measuring, by a color analyzer CA410, the splicing display screen to record the luminance $lv_i^{T_0}$ corresponding to each gray scale i.

At step S102, when the splicing display screen is lit up in a second gray scale, determining the average temperature of the splicing display screen as the maximum temperature; and traversing through gray scales in the preset gray-scale range at the maximum temperature to determine second luminance information corresponding to each of the gray scales.

The second gray scale is 255, and the splicing display screen displays black. The method includes after the temperature of the screen is stable, measuring, by a thermometer, the temperature of each pixel in the splicing display screen; and calculating an average temperature of the entire screen as the maximum temperature $T_{max}$. The method includes maintaining the splicing display screen at the constant maximum temperature $T_{max}$; sequentially traversing through gray scales in the preset gray-scale range from 0 to 255, that is, lighting up the splicing display screen in the gray scales; and measuring, by a color analyzer CA410, the splicing display screen to record the luminance $lv_i^{T_{max}}$ corresponding to each gray scale i.

At step S103, under the condition that the first luminance information and the second luminance information meet a first preset condition, respectively determining a first target gray scale and a second target gray scale, and calculating a difference value between the first target gray scale and the second target gray scale as a compensation gray scale.

The first preset condition is $lv_i^{Tmax} \approx lv_j^{T0}$.

The method includes traversing through the gray scales in the range from 0 to 255 to determine the first target gray scale i and the second target gray scale j with $lv_i^{Tmax} \approx lv_j^{T0}$. The second target gray scale j is the compensation gray scale for the first target gray scale i, and the compensation data for the first target gray scale i is i−j. Since the luminance decreases with the increase of the temperature, i is greater than j with $lv_i^{Tmax} \approx lv_j^{T0}$.

At step S104, the gray-scale compensation data table includes compensation gray scales for all gray scales in the preset gray-scale range, as shown in Table 1.

In Table 1, the compensation data for a gray scale of 0 is 0, the compensation data for a gray scale of 1 is 0, the compensation data for a gray scale of 128 is x, the compensation data for a gray scale of 254 is y, and the compensation data for a gray scale of 255 is z.

TABLE 1

| Gray Scale | Compensation Data | Peak Luminance Variation Factor |
|---|---|---|
| 0 | 0 | α = Actual Peak Luminance/Measured Peak Luminance |
| 1 | 0 | / |
| . . . | . . . | . . . |
| 128 | x | / |
| . . . | . . . | . . . |
| 254 | y | / |
| 255 | z | / |

At the same time, considering the changes in peak luminance of the splicing display screen, the compensation data for each gray scale is required to be adjusted. Therefore, the gray-scale compensation data table further includes the peak luminance variation factor of the splicing display screen. The peak luminance variation factor of the splicing display screen is α=actual peak luminance/measured peak luminance. The maximum luminance corresponding to the second gray-scale displayed by various splicing display screens are different. Therefore, various splicing display screens correspond to different peak luminance variation factors. The peak luminance variation factor α is determined based on the measured peak luminance set for the splicing display screen, and the compensation data is adjusted based on the peak luminance variation factor α, so as to calculate the initial gray-scale compensation data.

In some examples, determining the target influence coefficient for each frame of the history image data in step S2 includes steps S21 to S26.

At step S21, acquiring the time interval for visible image sticking, and determining the number of the frame of image data in the time interval according to the number of the frames of image data uploaded per second.

In an implementation, a first region of the splicing display screen is lit up in a first gray scale, a second region of the splicing display screen is lit up in a second gray scale, and both of the first region and the second region are lit up simultaneously in the second gray scale every target time interval to obtain the time interval for the visible residual image to appear.

Figure 6:
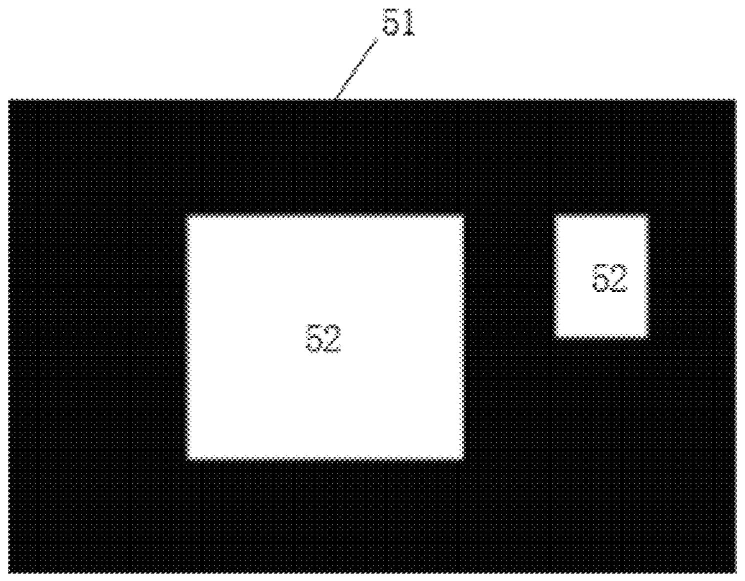
FIG. 6 is a schematic diagram showing a display effect when a splicing display screen is lit up in gray scales with high contrast according to an embodiment of the present disclosure.

Herein, the first gray scale and the second gray scale are gray scales with large contrast difference. For example, FIG. 6 is a schematic diagram showing a display effect when a splicing display screen is lit up in gray scales with high contrast difference according to an embodiment of the present disclosure. As shown in FIG. 6, the first gray scale is 0, and the second gray scale is 255. At a timing $t_0$, the first region 51 of the splicing display screen is lit up in a gray scale of 0, the second region 52 of the splicing display screen is lit up in a gray scale of 255. Every target time interval, both of the first region 51 and the second region 52 are simultaneously lit up in a gray scale of 255, that is, the entire screen is switched to white. The timing $t_2$ when the image sticking visible to human eyes occurs is recorded, so that the time interval when the image sticking occurs is obtained $\Delta t = t_2 - t_0$. The number $N = \Delta t \times F$ of frames of image data during the time interval is determined according to the number, which is denoted as F (also referred to as FPS), of frames of image data uploaded per second.

At step S22, acquiring multiple frames of test image data and preset initial influence coefficients for the multiple frames of test image data according to the number of the frames of image data during the time interval.

A sum of the initial influence coefficients is 1. The initial influence coefficient of the immediately previous frame of test image data is greater than or equal to the initial influence coefficient of the next frame of test image data.

In an example, N frames of test image data are acquired according to the number of frames of image data during the time interval. It is given that the initial influence coefficients of the frames of test image data are equal to each other and a sum of the initial influence coefficients of the frames of test image data is 1, that is, the initial influence coefficients $a_1 = a_2 = \ldots = a_n = 1/N$.

At step S23, acquiring a first temperature increased amount of the splicing display screen after the multiple frames of test image data play.

Specifically, after N frames of test image data play, the temperature increased amount (i.e., the first temperature increased amount $\Delta T_1$) of the splicing display screen is recorded.

At step S24, weighting a fourth gray-scale data for each pixel in each frame of test image data according to each initial influence coefficient to obtain second gray-scale image data.

The fourth gray-scale data is a gray-scale value of a pixel in the test image data and thus may be obtained directly.

The step is the same as the step for determining the first gray-scale image data, specifically, the fourth gray-scale data for each pixel in each frame of test image data is weighted according to Equation 1 to obtain the second gray-scale image data, and the specific calculating process will not be repeated herein.

At step S25, lighting up the splicing display screen according to the second gray-scale image data for a lighting-up time period which is the same as the time period of playing the multiple frames of test image data; and acquiring a second temperature increased amount of the splicing display screen obtained after the lighting-up time period elapses.

The splicing display screen is lit up according to the second gray-scale image data for a lighting-up time period to display the image corresponding to the second gray-scale image data, and the lighting-up time period is the same as the time period $\Delta t$ of playing N frames of test image data at step S23. After the splicing display screen is lit up for a time period $\Delta t$, the temperature increased amount (i.e., the second temperature increased amount $\Delta T_2$) of the splicing display screen is recorded.

At step S26, when a difference between the first temperature increased amount and the second temperature increased amount does not meet a second preset condition, updating the initial influence coefficient until the difference between the first temperature increased amount and the second temperature increased amount meets the second preset condition; and taking the updated initial influence coefficient as the target influence coefficient.

The second preset condition is $|\Delta T_2-\Delta T_1|\leq\varepsilon$, wherein $\varepsilon\leq 1.5°$ C.

It is determined whether $|\Delta T_2-\Delta T_1|$ is less than $\varepsilon$ or not. If not, the initial influence coefficient is updated. Specifically, for each of the initial influence coefficients, the initial influence coefficient $a_i$ corresponding to the immediately previous frame of test image data and the initial influence coefficient $a_{i+1}$ corresponding to the next frame of test image data are adjusted respectively, such that the adjusted initial influence coefficient $a_i'$ corresponding to the immediately previous frame of test image data is greater than the initial influence coefficient $a_i$ corresponding to the immediately previous frame of test image data, and the adjusted initial influence coefficient $a_{i+1}'$ corresponding to the next frame of test image data is smaller than the initial influence coefficient $a_{i+1}$ corresponding to the next frame of test image data, and at the same time it should be satisfied that $\Sigma_{i=0}^{N} a_i=1$, so as to obtain an updated set of initial influence coefficients $a_1, a_2, \ldots, a_n$. Afterwards, step S24 is executed repeatedly until $|\Delta T_2-\Delta T_1|\leq\varepsilon$ to obtain the latest updated set of initial influence coefficients $a_1, a_2, \ldots, a_n$ as the target influence coefficients.

In some examples, determining the fitting relationship information between the gray scale and the temperature influence in step S2 includes steps S201 to S204.

At step S201, acquiring and recording a second initial temperature $T_1$ of the splicing display screen when the splicing display screen is lit up.

At step S202, for one of the screen characteristics and various measured peak luminance of the splicing display screen, respectively traversing through the gray scales in a preset gray-scale range to determine first average temperatures $\overline{T_1}$ of the splicing display screen; and determining a first set of influence factors according to the first average temperatures $\overline{T_1}$ corresponding to the gray scales and the second initial temperature $T_1$.

Figure 7:
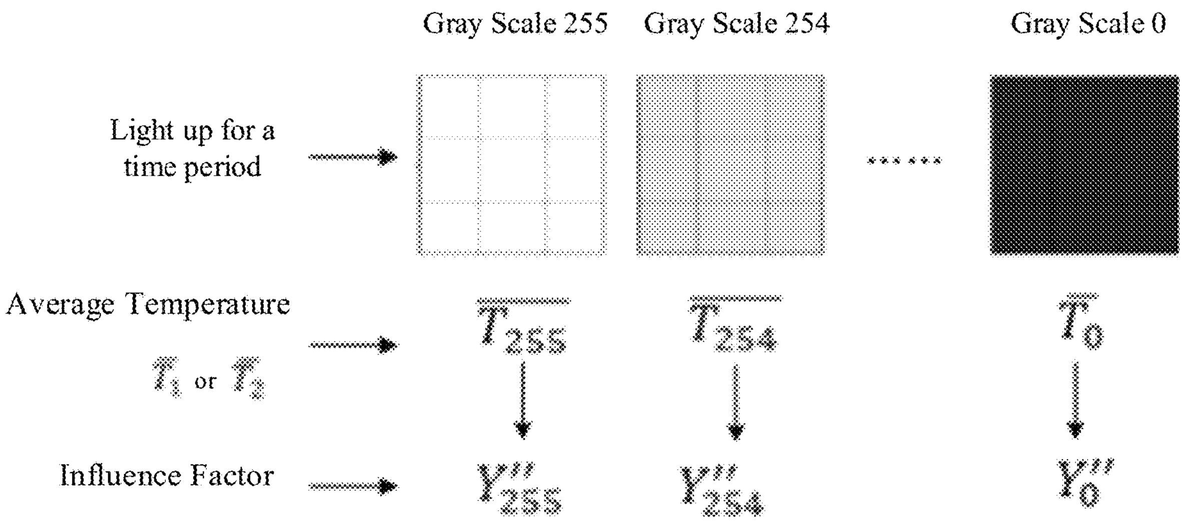
FIG. 7 is a schematic flow chart for determining an influence factor according to an embodiment of the present disclosure.

FIG. 7 is a schematic flow chart for determining an influence factor according to an embodiment of the present disclosure. As shown in FIG. 7, the screen characteristic is a gamma characteristic, and any one of multiple gamma values and any one of multiple peak luminance may be set for the splicing display screen. For one of the multiple gamma values, the method includes changing the measured peak luminance of the splicing display screen in sequence and changing one measured peak luminance every time the splicing display screen is lit up for a time period; and traversing through each gray scale in the preset gray-scale range from 0 to 255 once every time when the measured peak luminance is changed to determine a first average temperature $\overline{T_1}(\overline{T_0}\sim\overline{T_{255}}$ as shown in FIG. 7) of the splicing display screen at each gray scale. Herein, giving one gamma value and W measured peak luminance, a total of 255×W first average temperatures are determined.

Herein, determining the first average temperature of the splicing display screen may include: measuring temperatures of pixels of the splicing display screen; and averaging the temperatures of the pixels to obtain the first average temperature $\overline{T_1}$ of the splicing display screen.

The temperature change corresponding to each gray scale is $\overline{T_1}-T_1$, and the influence factor is $Y''=(\overline{T_1}-T_1)/T_1(Y_0''\sim Y_{255}'$ as shown in FIG. 7).

The number of the first set of influence factors is 255×W.

At step S203, for one of the measured peak luminance and various screen characteristics of the splicing display screen, respectively traversing through gray scales in a preset gray-scale range to determine second average temperatures of the splicing display screen; and determining a second set of influence factors according to the second average temperatures corresponding to the gray scales and the second initial temperature.

As shown in FIG. 7, for one of the measured peak luminance, the method includes changing the gamma values of the splicing display screen in sequence, and changing one gamma value every time the splicing display screen is lit up for a time period; and traversing through each gray scale in the preset gray-scale range from 0 to 255 once every time when one gamma value is changed to determine a second average temperature $\overline{T_2}$ of the splicing display screen at each gray scale. Herein, giving one measured peak luminance and Q gamma values, a total of 255×Q second average temperatures $\overline{T_2}$ are determined.

The temperature change corresponding to each gray scale is $\overline{T_2}-T_1$, and an influence factor is $Y'''=(\overline{T_2}-T_1)/T_1$.

The number of the second set of influence factors is 255×Q.

At step S204, obtaining, through a fitting method, fitting relationship information between the gray scale and the temperature influence according to the first set of influence factors and the second set of influence factors corresponding to the gray scales in the preset gray-scale range.

Specifically, the fitting relationship information between the gray scale and the temperature influence is obtained through fitting according to 255×W influence factors $Y''=(\overline{T_1}-T_1)/T_1$ in a case of the fixed gamma value and 255×Q influence factors $Y'''=(\overline{T_2}-T_1)/T_1$ in a case of the fixed measured peak luminance, wherein the fitting relationship information is $Y=\theta\times G^{\gamma}$, $\theta$=actual peak luminance/measured peak luminance, the actual peak luminance is a fixed peak luminance defined in advance and in general set to 400 nits. The measure peak luminance is the peak luminance currently set for the splicing display screen, and $\gamma$ indicates the gamma value currently set for the splicing display screen.

In some examples, setting the filter parameter information in step S2 includes steps S301 to S304.

At step S301, acquiring a third initial temperature $T_2$ when P×P display panels of the splicing display screen are not lit up.

At step S302, lighting up a target display panel located in a center of the P×P display panels according to the second gray scale, and carrying out region division on each display panel (i.e., dividing each display panel to a plurality of display regions) to obtain a third average temperature of each display region.

The second gray scale is 255, and P=3. Taking 3×3 display panels as an example, a $5^{th}$ display panel is in the center of the 3×3 display panels, that is, the target display panel. Each of the display panels is divided into k×k display regions, wherein k is 3 or 5. The temperature of each pixel is measured, and the third average temperature $\overline{T_3}$ for each of 3k×3k display regions is calculated based on the temperature of each pixel.

At step S303, calculating a difference between the third average temperature and the third initial temperature as a temperature variation amount of the display region.

The temperature variation amount is $\Delta T=|\overline{T_3}-T_2|$. Therefore, the temperature variation amount ΔT for each of the 3k×3k display regions may be obtained, and the maximum temperature variation amount $\Delta T_{max}$ may be determined.

At step S304, normalizing the ratio of the temperature variation amount of each display region to the maximum temperature variation amount of the display region to obtain the filter parameter information. The number of parameters in the filter parameter information is the same as the number of divided display regions.

The method includes determining the ratio β of the temperature variation amount ΔT of each display region to the maximum temperature variation amount $\Delta T_{max}$ of the display region to obtain a dimensionless parameter $\beta_i=\Delta T_i/\Delta T_{max}$, wherein i represents the $i^{th}$ display region; and performing the normalization processing on $\beta_i$ corresponding to each display region, such that $\Sigma_{i=1}^{P\times P}\beta_i=1$.

Based on the same inventive concept, an embodiment of the present disclosure further provides a display device for a splicing display screen, and the principle of the problem solved by the display device for the splicing display screen in the embodiment of the present disclosure is similar to the principle of the problem solved by the embodiment of the display method for the splicing display screen in the embodiment of the present disclosure, therefore the specific description of the display device for the splicing display screen may refer to the specific description of the embodiment of the display method for the splicing display screen, and will not be described herein again.

Figure 8:
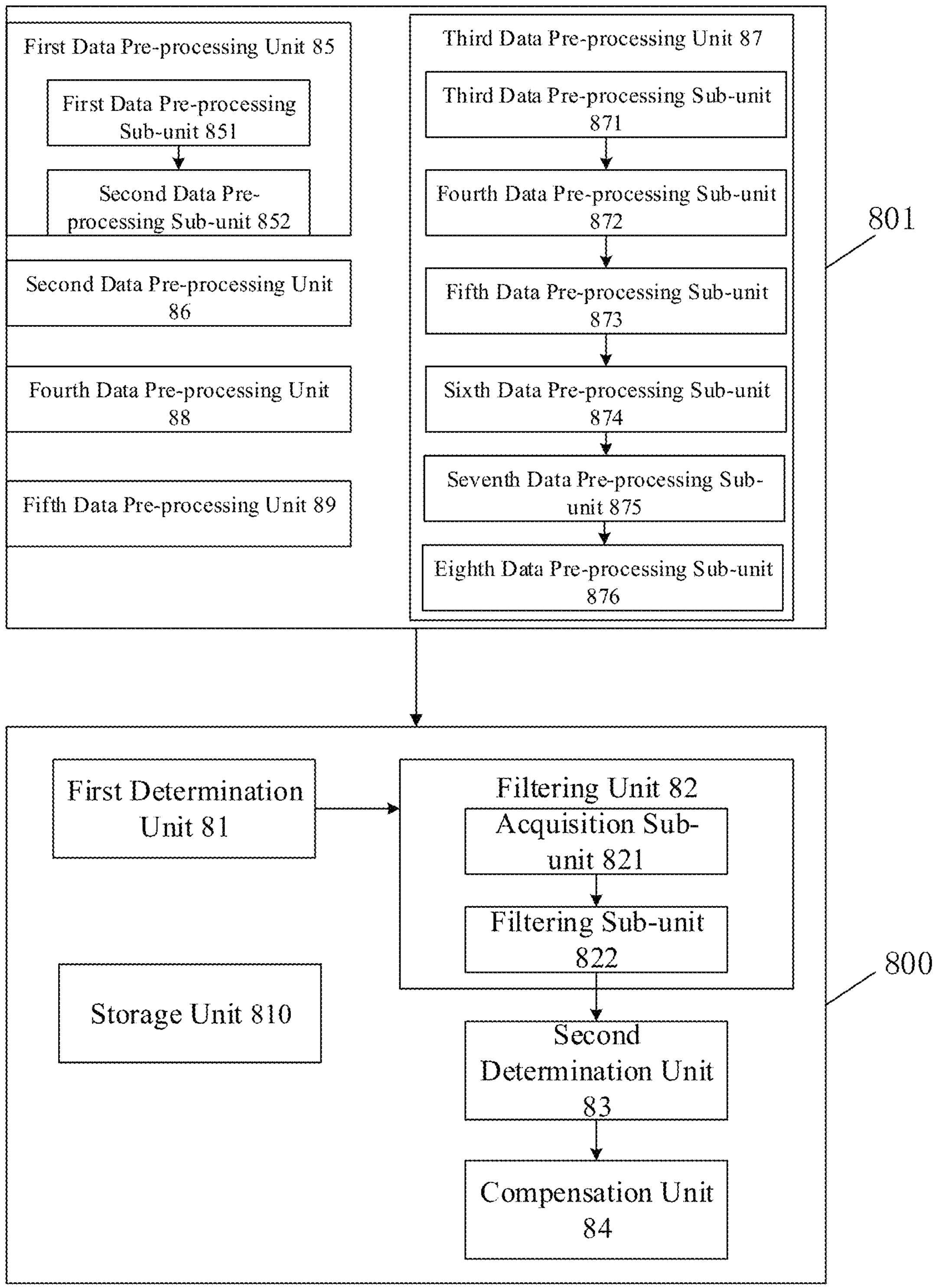
FIG. 8 is a schematic diagram of a display device for a splicing display screen according to an embodiment of the present disclosure.

In a second aspect, an embodiment of the present disclosure further provides a display device for a splicing display screen, where the splicing display screen includes a plurality of display panels spliced together. FIG. 8 is a schematic diagram showing a display device for a splicing display screen according to an embodiment of the present disclosure. As shown in FIG. 8, the display device for the splicing display screen includes a gray-scale compensation module 800. The gray-scale compensation module 800 is configured to sample frames of image data in a sequence of video frames according to a preset sequence; and perform, each time one frame of image data is sampled, a gray-scale compensation process on (i.e., compensating a gray scale of) the sampled current frame of image data, so as to obtain compensated frame of image data.

The gray-scale compensation module 800 includes a first determination unit 81, a filtering unit 82, a second determination unit 83, and a compensation unit 84.

The first determination unit 81 is configured to determine initial gray-scale compensation data according to first gray-scale data for each pixel in the current frame of image data and a pre-generated gray-scale compensation data table.

The filtering unit 82 is configured to filter each temperature influence data according to preset filter parameter information to obtain a gray-scale compensation coefficient.

The second determination unit 83 is configured to determine target gray-scale compensation data according to the gray-scale compensation coefficient and the initial gray-scale compensation data.

The compensation unit 84 is configured to perform gray-scale compensation on the current frame of image data according to the target gray-scale compensation data to obtain compensated frame of image data.

Specific process may refer to steps S1 to S5 of the display method for the splicing display screen in the embodiments described above and repeated details will not be repeated herein again.

The embodiment of the present disclosure provides the display device for the splicing display screen, which may perform the gray-scale compensation process on sampled current frame of image data without acquiring the temperature of the splicing display screen, that is, performing a residual image reduction process on the current frame of image data, which can improve the uniformity and consistency of the displayed image, thereby enhancing the visual experience of the user.

In some examples, the filtering unit 82 includes an acquisition sub-unit 821 and a filtering sub-unit 822.

The acquisition sub-unit 821 is configured to determine, according to at least one frame of history image data, a target influence coefficient of each frame of history image data on the current frame of image data, and attribute information of the splicing display screen, temperature influence data of the history image data on the current frame of image data; wherein the at least one frame of history image data is at least one frame of image data sampled before the current frame of image data is sampled.

In some examples, the acquisition sub-unit 821 is specifically configured to perform, based on each target influence coefficient, weighting process on the second gray-scale data for each pixel in each frame of history image data to obtain the first gray-scale image data; and process the third gray-scale data for each pixel in the first gray-scale image data according to the attribute information of the splicing display screen and the pre-determined fitting relationship information between the gray scale and the temperature influence to determine the temperature influence data.

Specific process may refer to step S2 in the display method for the splicing display screen in the embodiments described above and repeated details will not be described herein again.

In some examples, the filtering sub-unit 822 is specifically configured to divide each display panel into a plurality of regions according to the number of parameters in the filter parameter information and resolution information of each display panel, so as to obtain a plurality of display regions.

Determine regional temperature influence data for each display region according to each temperature influence data;

Filter the regional temperature influence data according to the filter parameter information to obtain an regional gray-scale compensation coefficient; and Take each regional gray-scale compensation coefficient as the gray-scale compensation coefficient for each pixel in the display region.

Specific process may refer to step S2 in the display method for the splicing display screen in the embodiments described above, and repeated details will not be described herein again.

In some examples, the display device for the splicing display screen further includes a data processing module 801. The data processing module 801 includes a first data pre-processing unit 85.

The first data pre-processing unit 85 is configured to determine first gray-scale data for each pixel in the current frame of image data. The first data pre-processing unit 85 includes a first data pre-processing sub-unit 851 and a second data pre-processing sub-unit 852.

The first data pre-processing sub-unit 851 is configured to obtain a ratio of the gray scales of sub-pixels of each pixel in the current frame of image data.

The second data pre-processing sub-unit 852 is configured to determine the first gray-scale data according to the ratio of the gray scales and the pixel information of the sub-pixels.

Specific process may refer to step S1 in the display method for the splicing display screen in the embodiments described above, and repeated details will not be described herein again.

In some examples, the first data pre-processing sub-unit 851 is specifically configured to light up the splicing display screen according to the colors of the sub-pixels, respectively, to obtain the temperature variation amounts of the splicing display screen for the colors of the sub-pixels; and take a ratio of the temperature variation amounts of the splicing display screen for the colors of the sub-pixels as the ratio of the gray scales of the sub-pixels.

The specific process thereof may refer to the steps S11 and S12 in the display method for the splicing display screen in the embodiments described above, and repeated details will not be repeated herein again.

In some examples, the data processing module 801 further includes a second data pre-processing unit 86 configured to determine a gray-scale compensation data table.

The second data pre-processing unit 86 is specifically configured to determine an average temperature of the splicing display screen as a first initial temperature when the splicing display screen is lit up according to a first gray scale; traverse through various gray scales in a preset gray-scale range at a first initial temperature to determine first luminance information corresponding to each gray scale; determine an average temperature of the splicing display screen as the maximum temperature when the splicing display screen is lit up according to a second gray scale; traverse through various gray scales in the preset gray-scale range at the maximum temperature to determine second luminance information corresponding to each gray scale; under the condition that the first luminance information and the second luminance information meet a first preset condition, respectively determine a first target gray scale and a second target gray scale; and calculate a difference value between the first target gray scale and the second target gray scale as a compensation gray scale, wherein the gray-scale compensation data table includes compensation gray scales for the various gray scales in the preset gray-scale range.

The specific process thereof may refer to the steps S101 to S104 in the display method for the splicing display screen in the embodiments described above, and repeated details will not be repeated herein again.

In some examples, the second data pre-processing unit 86 is further configured to determine a peak luminance variation factor of the splicing display screen according to the preset actual peak luminance and the measured peak luminance for the second gray scale; wherein the gray-scale compensation data table also includes the peak luminance variation factor of the splicing display screen.

The specific process thereof may refer to Table 1 in the above embodiments described above and the detailed description and repeated descriptions will not be repeated herein again.

In some examples, the first determination unit 81 is specifically configured to screen out a target compensation gray scale from the gray-scale compensation data table according to the first gray-scale data; and determine initial gray-scale compensation data according to the target compensation gray scale and the peak luminance variation factor.

The specific process thereof may refer to step S1 in the display method for the splicing display screen in the embodiments described above, and repeated details will not be described herein again.

In some examples, the data processing module 801 further includes a third data pre-processing unit 87 configured to determine the target influence coefficients of each frame of history image data on the current frame of image data.

The third data pre-processing unit 87 includes a third data pre-processing sub-unit 871, a fourth data pre-processing sub-unit 872, a fifth data pre-processing sub-unit 873, a sixth data pre-processing sub-unit 874, a seventh data pre-processing sub-unit 875, and an eighth data pre-processing sub-unit 876.

The third data pre-processing sub-unit 871 is configured to acquire a time interval of visible image sticking; and determine the number of frames of image data during the time interval according to the number of frames of image data uploaded per second.

The fourth data pre-processing sub-unit 872 is configured to obtain multiple frames of test image data and the preset initial influence coefficients of multiple frames of test image data according to the number of frames of image data during the time interval; wherein a sum of the initial influence coefficients is 1, and the initial influence coefficient of the immediately previous frame of test image data is greater than or equal to the initial influence coefficient of the next frame of test image data.

The fifth data pre-processing sub-unit 873 is configured to acquire the first temperature increased amount of the splicing display screen after playing the multiple frames of test image data.

The sixth data pre-processing sub-unit 874 is configured to perform a weighting process on the fourth gray-scale data for each pixel in each frame of the test image data based on each initial influence coefficient, so as to obtain second gray-scale image data.

The seventh data pre-processing sub-unit 875 is configured to light up the splicing display screen according to the second gray-scale image data for a lighting-up time period which is the same as a time period for playing multiple frames of test images, so as to obtain a second temperature increased amount of the splicing display screen obtained after the lighting-up time period elapses.

The eighth data pre-processing sub-unit 876 is configured to, when the difference between the first temperature increased amount and the second temperature increased amount does not satisfy the second preset condition, update the initial influence coefficient until the difference between the first temperature increased amount and the second temperature increased amount satisfies the second preset condition, and take the updated initial influence coefficient as the target influence coefficient.

The specific process thereof may refer to steps S21 to S26 in the display method for the splicing display screen in the embodiments described above, and repeated details will not be repeated herein again.

In some examples, the third data pre-processing sub-unit 871 is specifically configured to light up a first region of the splicing display screen according to a first gray scale, light up a second region of the splicing display screen according to a second gray scale, and light up both of the first region and the second region according to the second gray scale every target time interval to obtain a time interval when the visible image sticking occurs.

Specific process thereof may refer to step S21 in the display method for the splicing display screen in the embodiments described above, and repeated details will not be described herein again.

In some examples, the eighth data pre-processing sub-unit 876 is specifically configured to adjust the initial influence coefficient of the immediately previous frame of test image data and the initial influence coefficient of the next frame of test image data, respectively, such that the adjusted initial influence coefficient of the immediately previous frame of test image data is larger than the initial influence coefficient of immediately previous frame of test image data, and the adjusted initial influence coefficient of the next frame of test image data is smaller than the initial influence coefficient of the next frame of test image data.

Specific process may refer to step S26 in the display method for the splicing display screen in the embodiments described above, and repeated details will not be described herein again.

In some examples, the attribute information of the splicing display screen includes screen characteristics and peak luminance. The data processing module 801 further includes a fourth data pre-processing unit 88 configured to determine the fitting relationship information between the gray scales and the temperature influences.

The fourth data pre-processing unit 88 is specifically configured to obtain a second initial temperature of the splicing display screen before the splicing display screen is lit up. The fourth data pre-processing unit 88 is specifically configured to: for one of the screen characteristics and various peak luminance of the splicing display screen, respectively traverse through the gray scales in a preset gray-scale range to determine first average temperatures of the splicing display screen; and determine a first set of influence factors according to the first average temperatures and the second initial temperature corresponding to the gray scales; for one of the peak luminance and various screen characteristics of the splicing display screen, respectively traverse through gray scales in the preset gray-scale range to determine second average temperatures of the splicing display screen; and determine a second set of influence factors according to the second average temperatures corresponding to the gray scales and the second initial temperature; and obtain, through a fitting process, the fitting relationship information between the gray scales and the temperature influences according to the first set of influence factors and the second set of influence factors corresponding to the gray scales in the preset gray-scale range.

Specific process thereof may refer to steps S201 to S204 in the display method for the splicing display screen in the embodiments described above, and repeated details will not be described herein again.

In some examples, the data processing module 801 further includes a fifth data pre-processing unit 89 configured to determine filter parameter information.

The fifth data pre-processing unit 89 is specifically configured to acquire a third initial temperature when P×P display panels of the splicing display screen are not lit up, wherein P is a positive integer; light up a target display panel located in the center of the P×P display panels according to the second gray scale; divide each of display panels into a plurality of display regions to obtain a third average temperature of the display regions; calculate a difference between the third average temperature and the third initial temperature as a temperature variation amount of each display region; and normalize a ratio of the temperature variation amount of each display region to the maximum temperature variation amount of the display region to obtain the filter parameter information, wherein the number of parameters in the filter parameter information is the same as the number of divided display regions.

Specific process may refer to steps S31 to S34 in the display method for the splicing display screen in the embodiments described above, and repeated details will not be described herein again.

In some examples, the gray-scale compensation module 800 further includes a storage unit 810 configured to store the current frame of image data to a history cache database to update the history image data.

Figure 9:
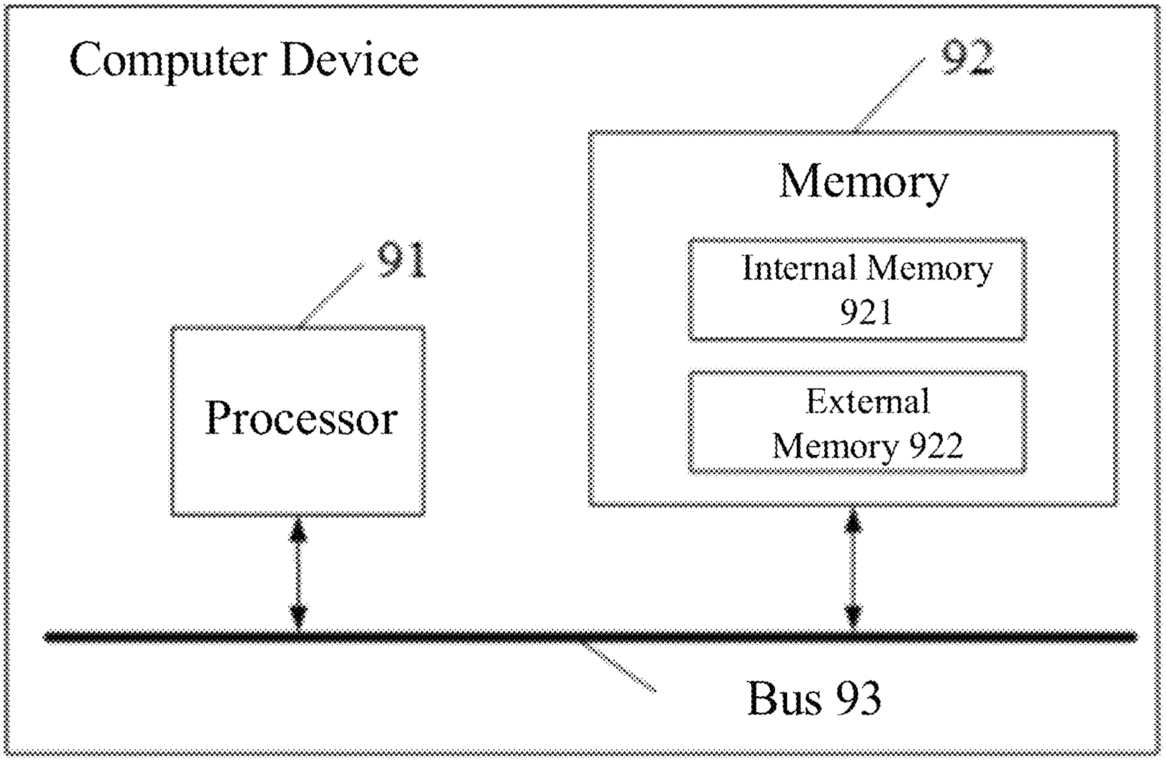
FIG. 9 is a schematic diagram showing a structure of a computer device according to an embodiment of the present disclosure.

In a third aspect, based on the same technical concept, an embodiment of the present disclosure further provides a computer device. FIG. 9 is a schematic diagram showing a structure of a computer device according to an embodiment of the present disclosure, the computer device includes a processor 91, a memory 92, and a bus 93.

The memory 92 stores machine-readable instructions executable by the processor 91. The processor 91 executes the machine-readable instructions stored in the memory 92. The processor 91 performs the following steps S1 to S5 when the machine-readable instructions are executed by the processor 91. At step S1, determining initial gray-scale compensation data according to the first gray-scale data for each pixel in the current frame of image data and a pre-generated gray-scale compensation data table; at step S2, acquiring temperature influence data for the current frame of image data; and filtering each temperature influence data according to preset filter parameter information to obtain a gray-scale compensation coefficient; at step S4, determining target gray-scale compensation data according to the gray-scale compensation coefficient and the initial gray-scale compensation data; and at step S5, performing gray-scale compensation on the current frame of image data according to the target gray-scale compensation data to obtain compensated frame of image data.

The memory 92 includes an internal memory 921 and an external memory 922. The internal memory 921 is also called a built-in internal memory and is configured to temporarily store the operation data in the processor 91 and data exchanged with the external memory 922 such as a hard disk. The processor 91 exchanges data with the external memory 922 through the internal memory 921. When the computer device operates, the processor 91 communicates with the memory 92 through the bus 93, so that the processor 91 executes the execution instructions mentioned in the method in the embodiments described above.

In a fourth aspect, an embodiment of the present disclosure further provides a non-transitory computer-readable storage medium storing instructions thereon which, when executed by the processor, cause the processor to perform steps in the display method for the splicing display screen in the embodiments described above. The storage medium may be a transitory or non-transitory computer-readable storage medium.

In a fifth aspect, an embodiment of the present disclosure further provides an electronic product, where the electronic product includes the display device for a splicing display screen according to the second aspect.

In an example, the embodiment of the present disclosure provides the electronic product including the display device for the splicing display screen, which can improve the sticking image displayed by the MLED due to the temperature difference and improve the acceptance of a user on picture display, and the electronic product may be applied to glass substrate products, such as COG (i.e., Chip on Glass) and the like. The COG means that an LED chip is directly die-bonded to a glass substrate and is driven by a thin film transistor for LED display.

It should be understood that the above embodiments are merely exemplary embodiments adopted to illustrate the principles of the present invention/utility model, but the present invention/utility model is not limited thereto. It will be apparent to one of ordinary skill in the art that various modifications and improvements can be made without departing from the spirit and essence of the invention/utility model, and such modifications and improvements also fall into the scope of the invention/utility model.

What is claimed is:

1. A display method for a splicing display screen comprising a plurality of display panels spliced with each other, wherein the display method comprises:

sampling frames of image data in a sequence of video frames according to a preset sequence; and compensating, each time one frame of image data is sampled, a gray scale of the sampled current frame of image data to obtain the compensated frame of image data; and the compensating the gray scale of the sampled current frame of image data to obtain the compensated frame of image data, comprises:

determining initial gray-scale compensation data according to first gray-scale data for each pixel in the current frame of image data and a gray-scale compensation data table generated in advance;

acquiring temperature influence data for the current frame of image data, and filtering the temperature influence data according to preset filter parameter information to obtain a gray-scale compensation coefficient;

determining target gray-scale compensation data according to the gray-scale compensation coefficient and the initial gray-scale compensation data; and compensating the gray scale of the current frame of image data according to the target gray-scale compensation data to obtain the compensated frame of image data.

2. The display method of claim 1, wherein the acquiring the temperature influence data for the current frame of image data, comprises:

determining, according to at least one frame of history image data, a target influence coefficient of each frame of history image data on the current frame of image data, and attribute information of the splicing display screen, the temperature influence data of the history image data on the current frame of image data; wherein the at least one frame of history image data is at least one frame of image data sampled before the current frame of image data is sampled.

3. The display method of claim 2, wherein the determining, according to the at least one frame of history image data, the target influence coefficient of each frame of history image data on the current frame of image data, and the attribute information of the splicing display screen, the temperature influence data of the history image data on the current frame of image data, comprises:

weighting second gray-scale data for each pixel in each frame of history image data based on each target influence coefficient to obtain first gray-scale image data; and processing third gray-scale data for each pixel in the first gray-scale image data according to the attribute information of the splicing display screen and predetermined fitting relationship information between a gray scale and a temperature influence to determine the temperature influence data.

4. The display method of claim 1, wherein the filtering the temperature influence data according to the filter parameter information to obtain the gray-scale compensation coefficient, comprises:

dividing, according to a number of parameters in the filter parameter information and resolution information of each display panel, each display panel into a plurality of display regions;

determining regional temperature influence data for each display region according to the temperature influence data;

filtering the regional temperature influence data according to the filter parameter information to obtain a regional gray-scale compensation coefficient; and serving each regional gray-scale compensation coefficient as the gray-scale compensation coefficient of each pixel in the corresponding display region.

5. The display method of claim 1, further comprising determining the first gray-scale data for each pixel in the current frame of image data, comprising:

acquiring a ratio of gray scales of sub-pixels of each pixel in the current frame of image data; and determining the first gray-scale data according to the ratio of the gray scales and the pixel information of the sub-pixels.

6. The display method of claim 5, wherein the acquiring the ratio of the gray scales of the sub-pixels of each pixel in the current frame of image data, comprises:

lighting up the splicing display screen according to colors of the sub-pixels respectively to obtain temperature variation amounts of the splicing display screen for the colors; and serving a ratio of the temperature variation amounts of the splicing display screen for the colors as the ratio of the gray scales of the sub-pixels.

7. The display method of claim 1, further comprising determining the gray-scale compensation data table, comprising:

determining, when the splicing display screen is lit up according to a first gray scale, an average temperature of the splicing display screen as a first initial temperature; and traversing through gray scales in a preset gray-scale range at the first initial temperature to determine first luminance information at each of the gray scales;

determining, when the splicing display screen is lit up according to a second gray scale, an average temperature of the splicing display screen as a maximum temperature; traversing through the gray scales in the preset gray-scale range at the maximum temperature to determine second luminance information at each of the gray scales; and under a condition that the first luminance information and the second luminance information meet a first preset condition, respectively determining a first target gray scale and a second target gray scale, and calculating a difference value between the first target gray scale and the second target gray scale as a compensation gray scale;

wherein the gray-scale compensation data table comprises the compensation gray scales of the gray scales in the preset gray-scale range.

8. The display method of claim 7, further comprising:

determining a peak luminance variation factor of the splicing display screen according to preset actual peak luminance and measured peak luminance for the second gray scale;

wherein the gray-scale compensation data table further comprises the peak luminance variation factor of the splicing display screen.

9. The display method of claim 8, wherein the determining the initial gray-scale compensation data according to the first gray-scale data for each pixel in the current frame of image data and the gray-scale compensation data table generated in advance, comprises:

screening out a target compensation gray scale from the gray-scale compensation data table according to the first gray-scale data; and determining the initial gray-scale compensation data according to the target compensation gray scale and the peak luminance variation factor.

10. The display method of claim 2, wherein the determining the target influence coefficient of each frame of history image data on the current frame of image data, comprises:

acquiring a time interval when visible image sticking occurs; and determining the number of frames of image data during the time interval according to the number of the frames of image data uploaded per second;

acquiring multiple frames of test image data according to the number of the frames of image data during the time interval and acquiring preset initial influence coefficients of the multiple frames of test image data; wherein a sum of the initial influence coefficients is 1, and the initial influence coefficient of the immediately previous frame of test image data is greater than or equal to the initial influence coefficient of the next frame of test image data;

acquiring a first temperature increased amount of the splicing display screen after playing the multiple frames of test image data;

weighting fourth gray-scale data of each pixel in each frame of the test image data based on each initial influence coefficient to obtain second gray-scale image data;

lighting up the splicing display screen according to the second gray-scale image data for a lighting-up time period, with the lighting-up time period being the same as a time period for playing the multiple frames of test image data; and acquiring a second temperature increased amount of the splicing display screen after the lighting-up time period elapses; and in response to a difference between the first temperature increased amount and the second temperature increased amount not meet a second preset condition, updating the initial influence coefficient until the difference between the first temperature increased amount and the second temperature increased amount meets the second preset condition, and serving the updated initial influence coefficient as the target influence coefficient.

11. The display method of claim 10, wherein the acquiring the time interval when the visible image sticking occurs, comprises:

lighting up a first region of the splicing display screen according to a first gray scale;

lighting up a second region of the splicing display screen according to a second gray scale; and lighting up both of the first region and the second region simultaneously according to the second gray scale every target time interval to obtain the time interval when the visible image sticking occurs.

12. The display method of claim 10, wherein the updating the initial influence coefficient, comprises:

for each of the initial influence coefficients, respectively adjusting the initial influence coefficients of the immediately previous frame of test image data and the next frame of test image data, such that the adjusted initial influence coefficient of the immediately previous frame of test image data is larger than the unadjusted initial influence coefficient of the immediately previous frame of test image data, and the adjusted initial influence coefficient of the next frame of test image data is smaller than the unadjusted initial influence coefficient of the next frame of test image data.

13. The display method of claim 3, wherein the attribute information of the splicing display screen comprises screen characteristics and peak luminance; and the determining the fitting relationship information between the gray scale and the temperature influence, comprises:

acquiring a second initial temperature of the splicing display screen when the splicing display screen is not lit up;

for one of the screen characteristic and various peak luminance of the splicing display screen, respectively traversing through gray scales in a preset gray-scale range to determine first average temperatures of the splicing display screen; and determining a first set of influence factors according to the first average temperatures at the gray scales and the second initial temperature;

for one of the peak luminance and various screen characteristics of the splicing display screen, respectively traversing through the gray scales in the preset gray-scale range to determine second average temperatures of the splicing display screen; and determining a second set of influence factors according to the second average temperatures at the gray scales and the second initial temperature; and acquiring, through a fitting process, the fitting relationship information between the gray scale and the temperature influence according to the first set of influence factors and the second set of influence factors corresponding to the gray scales in the preset gray-scale range.

14. The display method of claim 1, further comprising determining the filter parameter information, comprising:

acquiring a third initial temperature of P×P display panels of the splicing display screen when the P×P display panels are not lit up, wherein P is a positive integer;

lighting up a target display panel located in a center of the P×P display panels according to a second gray scale; and dividing each of the display panels into a plurality of display regions to obtain a third average temperature of each of the display regions;

calculating a difference between the third average temperature and the third initial temperature as a temperature variation amount of each display region; and normalizing a ratio of the temperature variation amount of each display region to a maximum temperature variation amount of the display region to obtain the filter parameter information, wherein the number of parameters in the filter parameter information is the same as the number of the divided display regions.

15. The display method of claim 1, further comprising:

storing the current frame of image data into a history cache database to update the history image data.

16. A computer device, comprising: a processor, a memory and a bus, wherein the memory stores machine readable instructions executable by the processor, the processor communicates with the memory via the bus when the computer device operates, when the machine readable instructions are executed by the processor, the machine readable instructions cause the processor to perform the display method for the splicing display screen of claim 1.

17. A non-transitory computer-readable storage medium storing computer programs which, when executed by a processor, cause the processor to perform the display method for the splicing display screen of claim 1.

18. A display device for a splicing display screen comprising a plurality of display panels spliced with each other, wherein the display device for the splicing display screen comprises a gray-scale compensation module;

the gray-scale compensation module is configured to sample frames of image data in a sequence of video frames according to a preset sequence; and compensate, each time one frame of image data is sampled, a gray scale of the sampled current frame of image data to obtain compensated frame of image data; and the gray-scale compensation module comprises a first determination unit, a filtering unit, a second determination unit, and a compensation unit, wherein the first determination unit is configured to determine initial gray-scale compensation data according to first gray-scale data for each pixel in the current frame of image data and a pre-generated gray-scale compensation data table;

the filtering unit is configured to acquire temperature influence data of the current frame of image data; and filter each temperature influence data according to preset filter parameter information to obtain a gray-scale compensation coefficient;

the second determination unit is configured to determine target gray-scale compensation data according to the gray-scale compensation coefficient and the initial gray-scale compensation data; and the compensation unit is configured to compensate the gray scale of the current frame of image data according to the target gray-scale compensation data to obtain the compensated frame of image data.

19. An electronic product, comprising the display device for the splicing display screen of claim 18.

* * * * *